United States Patent
Kupferman et al.

(10) Patent No.: US 7,962,616 B2
(45) Date of Patent: Jun. 14, 2011

(54) REAL-TIME ACTIVITY MONITORING AND REPORTING

(75) Inventors: Michael Kupferman, Zikron Ya'akov (IL); Ido Hardonag, Zikron Ya'akov (IL)

(73) Assignee: Micro Focus (US), Inc., Rockville, MD (US)

( * ) Notice: Subject to any disclaimer, the term of this patent is extended or adjusted under 35 U.S.C. 154(b) by 0 days.

(21) Appl. No.: 11/230,987

(22) Filed: Sep. 19, 2005

(65) Prior Publication Data

US 2007/0039049 A1  Feb. 15, 2007

Related U.S. Application Data

(60) Provisional application No. 60/707,630, filed on Aug. 11, 2005.

(51) Int. Cl.
*G06F 13/00* (2006.01)
(52) U.S. Cl. ............... 709/225; 709/224; 726/22
(58) Field of Classification Search .............. 709/217, 709/219, 223, 224, 227, 225, 250; 719/328, 719/329; 726/22, 23, 24
See application file for complete search history.

(56) References Cited

U.S. PATENT DOCUMENTS

| | | | |
|---|---|---|---|
| 5,568,468 A * | 10/1996 | Ogasawara et al. | 370/230 |
| 5,742,762 A * | 4/1998 | Scholl et al. | 709/200 |
| 6,170,011 B1 | 1/2001 | Macleod Beck et al. | |
| 6,189,033 B1 * | 2/2001 | Jin et al. | 709/225 |
| 6,321,338 B1 | 11/2001 | Porras et al. | |
| 6,453,345 B2 * | 9/2002 | Trcka et al. | 709/224 |
| 6,473,407 B1 | 10/2002 | Ditmer et al. | |
| 6,708,212 B2 | 3/2004 | Porras et al. | |
| 6,768,994 B1 | 7/2004 | Howard et al. | |
| 6,892,221 B2 * | 5/2005 | Ricart et al. | 709/203 |
| 6,947,985 B2 * | 9/2005 | Hegli et al. | 709/224 |
| 7,242,668 B2 * | 7/2007 | Kan et al. | 370/234 |
| 7,392,542 B2 * | 6/2008 | Bucher | 726/22 |
| 7,765,593 B1 * | 7/2010 | Lowe et al. | 726/22 |
| 7,818,800 B1 * | 10/2010 | Lemley et al. | 726/22 |
| 2001/0044840 A1 * | 11/2001 | Carleton | 709/223 |
| 2002/0162026 A1 * | 10/2002 | Neuman et al. | 713/201 |
| 2003/0195803 A1 * | 10/2003 | Ketonen | 705/14 |
| 2004/0032828 A1 * | 2/2004 | Satt et al. | 370/230 |
| 2004/0117478 A1 * | 6/2004 | Triulzi et al. | 709/224 |
| 2004/0158631 A1 * | 8/2004 | Chang et al. | 709/224 |
| 2005/0229246 A1 * | 10/2005 | Rajagopal et al. | 726/14 |
| 2006/0037077 A1 * | 2/2006 | Gadde et al. | 726/23 |
| 2006/0137009 A1 * | 6/2006 | Chesla | 726/22 |
| 2006/0218267 A1 * | 9/2006 | Khan et al. | 709/224 |
| 2007/0022119 A1 * | 1/2007 | Roy et al. | 707/10 |
| 2007/0180225 A1 * | 8/2007 | Schmidt | 713/152 |

OTHER PUBLICATIONS

International Search Report, PCT/US06/28438, dated Jun. 5, 2007, 3 pages.
Written Opinion of the International Searching Authority, PCT/US06/28438, dated Jun. 5, 2007, 5 pages.

* cited by examiner

*Primary Examiner* — Viet Vu
(74) *Attorney, Agent, or Firm* — Kokka & Backus, PC

(57) ABSTRACT

In order to track activities in a computerized system with client-server or other communications, a system configuration is needed which monitors, logs and reports traffic. This is somewhat akin to but not entirely similar a firewall. Thus, the invention contemplates a real-time, platform-independent, rule-based activity monitor for detecting a particular activity of interest as it occurs and for reporting such activity and the user substantially as fast.

6 Claims, 19 Drawing Sheets

Select Value

Select The Value

Select the value to be used in the condition

Enter the condition value:

[1000]

Help  < Back  Next>  Cancel

FIG. 10

REAL-TIME ACTIVITY MONITORING AND REPORTING

REFERENCE TO EARLIER FILED APPLICATIONS

This application claims the benefit and incorporates by reference U.S. Provisional Application Ser. No. 60/707,630, filed Aug. 11, 2005, entitled "REAL-TIME ACTIVITY MONITORING AND REPORTING."

FIELD OF THE INVENTION

The present invention is related to monitoring of computer user behavior and more specifically to real-time, rule-based monitoring and reporting of activities which trigger events of usage of enterprise applications.

BACKGROUND

Network traffic is often regulated in that not all traffic is allowed access through a network. Much depends on the network infrastructure and its security settings and tools for controlling access. Traffic in networked computer systems is often controlled by firewalls that intercept Internet or other network communications to prevent intrusion of those communications that are unwanted.

At the same time, there are communications that are seemingly legitimate and authorized to access the network through the firewall but are otherwise improper. Communications are defined as being improper if they defy certain rules or create an irregularity or risk to the organization. One example of improper communications between an end-user (client) and a host involve access for the purpose of obtaining private or privileged information in contravention of the organization's usual operating procedures. Another example of improper communication between the client and host is a security breach, where an un-privileged user (e.g., employee) gains access and makes unauthorized changes to company records. Then again, a legitimate and proper communication may nevertheless be of interest and therefore targeted for analysis and reporting. Such legitimate communications may include information relevant to the operations of an organization somewhere remote or enterprise-wide.

Hence, in order to track these improper or targeted communications, a system configuration in needed which monitors and reports traffic. This is somewhat akin to but not entirely similar a firewall.

One approach to tracking and detecting improper or targeted network communications, involves a system for real time monitoring of end-user and administrator communications and communication patterns (collectively "activity") using configurable business rules for detecting exceptions that indicate such activities. This system tracks all users in the mainframe server environments, e.g., iSeries systems, IBM 5250 or 3270 mainframes or AS/400 mid-range system environments or other client-server based systems such as ERP (enterprise resource planning) and packaged applications. This approach non-invasively tracks and records all user activity in legacy applications while creating a log or field-level audit trail of activity, where recorded data (activity log) is ciphered and digitally signed, thus being court-admissible. The system monitors any type of activity regardless of the host's operating system (OS/390, VSE, VM, OS/400, etc.) and the database used by the applications is transparent (including DB2, IMS, ADABAS, VSAM, etc.). The system runs on a separate server which intercepts communications between end-users and hosts by sniffing network transmissions through a network switch. The real time sniffing of transmission through a network switch creates an activity log that can be later accessed to retrieve evidence of improper, irregular, risky or simply targeted communications.

SUMMARY OF THE INVENTION

In view of the foregoing, the present invention contemplates, as one approach, a simpler- than-switch-based sniffing implementation and a more expedient access to the activity information. Thus, by comparison to a conventional firewall, an activity monitor contemplated by the present invention can be viewed as an 'application layer firewall.' This application layer firewall functions as a real-time, platform-independent, rule-based activity monitor ("Monitor") for detecting a particular activity of interest as it occurs and for reporting such activity and the user substantially as fast.

Whenever any of the monitored activities is identified as having met one of the rules, and is therefore one of the triggering application usage events, the monitor so indicates and initiates an action. Reporting and saving an activity report to a log are examples of the types of actions initiated by the monitor when rules are met (i.e., activity meets rule is TRUE). A system administrator can define the rules and actions by using the actual user interface of the particular enterprise applications. For instance, the user interface of an application presents fields or any other data structures and those that are of interest can be selected in the process of creating rules and actions that will be associated with the triggering event. Upon being defined, the rules and actions are deployed to the monitor for subsequent run-time usage.

The Monitor can be deployed into a legacy system without modifying its existing components or imposing any overhead on the legacy applications, and by being transparent to the server and client applications the Monitor lets network traffic pass through without disturbing communications flow between the host and clients.

In operation, the Monitor parses and based on the rules evaluates the client-server traffic (e.g., between a host and clients or between application programs in the same or different computers). The Monitor flags and reports in real time any activity or event communicated to/from the host which meets one of the rules. The Monitor can identify the source and destination of the activity and its nature while being entirely transparent to the traffic source and destination. For instance, the rule may include a text string with the name of a person wanted by authorities or of an activity forbidden under accounting practices. The Monitor can also be deployed for business management by monitoring business activity. Hence, the Monitor is useful for regulatory compliance, e.g., Sarbanes Oxley, law enforcement, business activity such as supply chain management, insurance and finance.

In one implementation, the Monitor is deployed into the network between a main frame and clients that run emulators such as the RUMBA® 3270/5250/VTXXX emulator, an AttachmateWRQ Reflection™ or any other comparable facility. In another implementation, the Monitor is deployed in an enterprise application interface (EAI) between two systems, say Tibco's EAI between a CRM system and a logistics system, or between two enterprise applications that interface with each other using protocols such as SOAP Web Services. In these implementations, the Monitor is akin to a proxy gateway (where to the client the Monitor looks like a server and to the server the Monitor looks like a client; neither one of them senses the Monitor's presence).

Alternatively, the Monitor is implemented as a local proxy deployed on the user PCs instead of the servers and where the downstream reporting and alerting duties are offloaded to an actions server. In other words, each client receives an instance of the local proxy and reports its findings to an action server for further downstream reporting. The rules engine in each instance of the local proxy is deployed to seamlessly and non-invasively observe and analyze, in real time, all traffic passing through the OS (operating system) layers toward the network adapter.

Preferably, the rules evaluation is implemented in these embodiments is a separate process or thread with lower priority. This way, the rules evaluation impose virtually no delay on the traffic between the client and the server. In other words, consistently, including during rules evaluation and actions triggered by targeted activities, the Monitor maintains transparency to the client and server. To this end, the Monitor allows creation and attachment of an XML instruction file with the rules for capturing events of interest.

Thus, in accordance with the purpose of the invention as illustrated and broadly described herein, the present invention provides various embodiments of a system and method for real-time activity monitoring and reporting.

Various system embodiments can be directed to real-time activity monitoring and reporting. One such system includes a host having an application; a client in communication link with the host, and a Monitor between the client and the host. The client has an emulator associated therewith through which the client is capable of interacting with and exchanging communications with the application via the host. The Monitor has traffic, rules and actions engines where the traffic engine is for substantially real-time sniffing and parsing of all communications between the client and the host, the rules engine is for substantially real-time evaluation of parsed communications, and the actions engine is for substantially real-time reporting of communications deemed to meet predetermined rules by the rules engine, wherein the Monitor is transparent to both the client and the application running on the host. In this embodiment, the host is deployed in a machine, such as the machine is a server, a mainframe, or a super-computer, and the Monitor is also deployed in that machine, although the Monitor is logically interposed between the host and the client.

A client can be a product that communicates directly with the host using a similar method. Thus, another system embodiment includes a host machine having a host and an application; an actions machine having an actions engine; and one or more user machines having a client, an emulator and a Monitor instance. Each client is in communication link with the host and capable, with their respective emulator, of exchanging communications with the application via the host. Each Monitor instance has traffic and rules engines where each traffic engine is for substantially real-time sniffing and parsing of all communications between a respective client and the host, each rules engine is for substantially real-time evaluation of parsed communications, and the actions engine is for receiving alerts from the rules engines and for substantially real-time reporting of communications deemed by such rules engines to meet predetermined rules. Again, the Monitor is transparent to each of the clients and the application running on the host. In this embodiment, the actions machine is a server and the host machine is a server, a mainframe or a super-computer.

A third system embodiment includes a first machine having a first application; a second machine having a second application; and an application interface interposed between the first and second machines and having a Monitor which is in communications link with the first and second applications. The Monitor has traffic, rules and actions engines where the traffic engine for substantially real-time sniffing and parsing of all communications between the first and second applications, the rules engine for substantially real-time evaluation of parsed communications, and the actions engine for substantially real-time reporting of communications deemed to meet predetermined rules by the rules engine. Here again, the Monitor is transparent to both the first and second applications.

This and other features, aspects and advantages of the present invention will become better understood from the description herein, appended claims, and accompanying drawings as hereafter described.

BRIEF DESCRIPTION OF THE DRAWINGS

The accompanying drawings which are incorporated in and constitute a part of this specification illustrate various aspects of the invention and together with the description, serve to explain its principles. Wherever convenient, the same reference numbers will be used throughout the drawings to refer to the same or like elements.

FIGS. 8-18 are screen shots of the user interface for creating rules, conditions and actions.

DETAILED DESCRIPTION OF THE INVENTION

Figure 1:
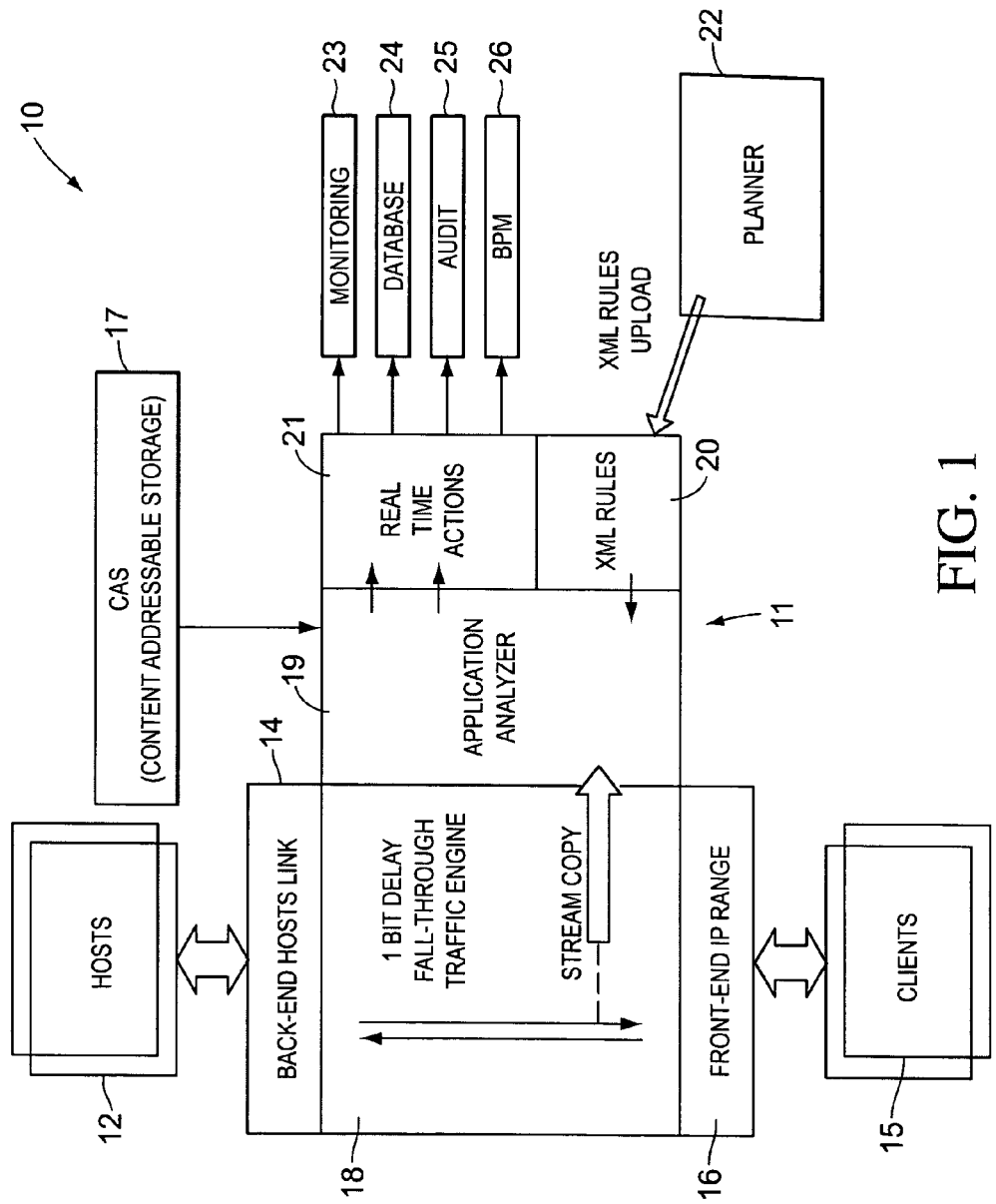
FIG. 1 is a system architecture diagram showing top-level details of a Monitor interconnected between hosts and clients.

As mentioned above, the present invention is based, in part, on the observation that there is a need for more expedient detection and reporting of improper or simply targeted activity. Thus, it is important to first understand where this need might exist and how such need might be met by a system configured in accordance with an embodiment of the present invention. To illustrate, we will examine a number of use cases.

Oftentimes, mission critical operations involve distributed branches and remote employees or affiliates using desktop or mobile devices that communicate with central systems. In such environment, transactions such as financial fund transfers, health-care and insurance queries and updates, CRM operations and manufacturing and retail warehouse movements are conducted via a wide spectrum of technologies, accessing central hosts and corporate-centric systems.

Consider for instance a manager in a financial service organization, or any other type of organization, who wishes to monitor business activities of the organization (BAM—Business Activity Monitoring). The goal of BAM is to allow the manager to perform the work more efficiently by monitoring processes within that manager's responsibility. The manager might want to record a specific event where, say, a certain amount of money higher than a pre-defined value is entered via a given application. This manager might want to have a 'dashboard' which provides a real-time view of the operations across several branches and several applications running on the bank's IBM Mainframe host.

So, to illustrate how it works, we assume that this manager logs on to the host and invokes a particular application, using the emulator. Looking at a screen associated with the particular application, the manager then clicks on the field or fields to which rules will be attached. The manager then goes through a "wizard"—a sequence of dialog windows that help in defining what to check (what rules and conditions to impose) and what to do if the check returns a positive value (as will be later explained in connection with FIGS. 6-16). After defining the rules, assuming this manager has the proper authorization, the rules are uploaded to the Monitor (e.g., OnWebIT™ appliances) and from that moment on the rules are applied to all screens associated with the application.

In the next example, also involving BAM, employees in a manufacturing floor enter into an AS/400 station the various hourly status and logistics needs. Managers on upper level floors and the headquarters would like their dashboard to show or alert them, in real time, on any irregularity or if any predetermined threshold is reached, which might project on the wider logistics outlook. Those thresholds can change dynamically, so rules for detecting events that meet or trigger these thresholds should be easily defined. For this purpose, an implementation of the present invention will allow definition of the rules without understanding the underlying technology or data structure, by simply using the application interface.

In an example involving IRS operations, we suppose that an IRS supervisor noticed someone from the inside looking up celebrity files too frequently. Internal affairs would like to know which station is used in this activity in order to track the internal breach of privacy. The IRS offices use a program written in COBOL and DB2 database which are deployed on the central mainframe. Thus, with a system in accordance with the present invention, the manager will define a rule for monitoring the activity. To this end, the manager will go to the planning tool, defining the screen where a file is searched (or defining a family of screens using a common denominator such as text on the screens). This rule might indicate that access needs to be flagged whenever a name out of a given list of celebrity records is searched. The access will be flagged by writing the user-id, the station (client, PC) address, time and date, and any details (e.g., type of access) into a secured central file, and by reporting to the monitoring tool (e.g., action server).

In the example involving a banking environment, we envision CRM (Customer relations management) audits. The call-center for a bank allows active recruitment of new customers, promotion of value added services via telemarketing campaigns, and quality of service improvements. However, systems which are accessed by the operators and customer representatives via emulators and hold the actual customer data are host driven and not ready to be customer-centric. In this case, the bank would like to: notify the CRM of any customer related activity taking place in one of the legacy applications running on the Mainframe; have managers get notification whenever a predetermined condition is met (such as a new customer account was created and more than $100,000 where deposited); and create an audit log because the company is subject to SOX (Sarbanes Oxley) audits, which requires recordation of specific actions onto the audit log for later analysis. The SOX reporting of financial activities is required to prove full control over the operational flow of financial activities; and the financial institution uses the present invention to further verify the integrity of such reports.

In the example involving intelligence services there is a supposed threat by militant groups that oppose the presence of armed forces in their country. For this example we assume further that this extremist group is getting confidential information from an internal source, say, the name and address of high ranking field commanders. The intelligence service would like to record any query in the system relating to the confidential information. Then, the system is required to monitor the traffic, report immediately, and record all communications which involve this data, including which station (user, client) has accessed this data and under what credentials.

In yet another example involving insurance operations, we assume real-time messaging into the CRM via legacy applications. Suppose that an international insurance company deploys a new CRM center while agents and doctors are still using, directly or indirectly, legacy emulation-based screens. The CRM is implemented using modern technology such as .Net or J2EE and is supposed to receive a message for every customer information update entered via the legacy platform. The Monitor is thus useful for this purpose.

Next, in the context of financial credit and risk control management (for cash flow control), various services, such credit-card services, trust management services, and gold accounts and private banking services, require maximum control over the assets for which they are responsible. However, it is hard to achieve instantaneous detection of transactions, or even trends, such as excessive credit card usage, suspicious transactions against a limited account, or irregular trading of certain stock in view of exchange limits. By using a system configured in accordance with an embodiment of the present invention, new predetermined rules as well as customized rules can be transparently applied to existing systems without any code change to the legacy system and without jeopardizing ongoing business.

In the context of value-added services, while monetary holdings, saving accounts and payment clearing services yield stable interest revenues for financial institutions, such organizations are constantly looking for ways to increase customer retention, improve their competitive advantage, and offer new revenue-generating services. This goal is hard to achieve since most services are based on existing banking infrastructure and the proprietary homegrown systems of the various banks. A system embodying an instance of the present invention allows plug and play services to be based simply on the behavior of legacy systems. Such service might be as simple as email alerts, where, for instance, card holders can command a self-service web site to provide email notifications to their mobile device whenever certain balance is reached in their personal account or certain activity occurs in relation to this account.

In yet another example, a manager responsible for productions in a car manufacturer's facilities requires notifications on his windows dashboard of any changes in car dealership orders that impacts the production line schedule. The production line involves a very comprehensive process that includes many subcontractors and scheduling and that is based on parts, colors, destinations and due-dates. Any change in orders, such as color change for a specific model order, might impact the entire line. The manager needs to be constantly informed in order to make the right decisions at the right time.

In the context of public safety and police force operations, someone might be leaking confidential information from the internal mainframe application. To breach security, someone must gain access to the confidential information with various discrete or even continuous queries via this application. With a system configured in accordance with an embodiment of the present invention, by introducing a specific rule, an internal affairs detective can immediately deploy a way to, in real-time, trace and catch the suspects.

Likewise, in the context of homeland security, the department of homeland security would need security alerts, with client addresses, on any Interne searches that somehow include targeted search terms (e.g. "explosive"). With deployment of the present invention, the public library, based on an IBM host can be tracked without changing or applying any new technology in the existing system. The alerts will be sent directly to the department's central alerts system.

In many of these environments regulations control operations and protect privacy, such as in healthcare. For this purpose, the Monitor provides a non-intrusive, rule-based engine that can explore usage of, say, a medical records management system and provide alerts on any suspect or non-compliant activity using such system.

In view of the foregoing, it is easy to understand the benefits that can be derived from a real time activity monitoring and reporting facility such as the Monitor. The description below outlines implementations details of the Monitor in accordance with principles of the present invention and its various embodiments.

In general, when a user wants to connect to host, such as IBM 5250 and 3270-based Mainframe computers, or an AS/400 server, the user opens an emulator and enters in the connection parameters the Internet address of the host whose resources the user wants to access (the host to which the user wants to log on). The host allows many different computers that run client software and use Internet resource called Telnet to simultaneously access its resources. Telnet clients are available for all the major operating systems. When establishing communications with the host, the client and host use proper Telnet protocol, after determining which terminal emulator will be used. Terminal emulation maps the keyboard and display functionality in a manner suitable for the particular situation.

Then, when communications flow a firewall typically intercepts and controls access of communications traffic. To monitor and report targeted activity in this communications traffic, however, the present invention provides the Monitor (in one implementation or another). By comparison to the firewall, the Monitor can be more closely characterized as an "application layer firewall."

To illustrate, some of the fundamental differences between the Monitor and a firewall involve the aspects of how traffic is blocked, where the facility is deployed, its capacity, connectivity and traces. For instance, a firewall requires understanding and use of protocols and the like, while the Monitor is easily deployed through the actual application or visual browsing of the service (web-service, API). Also, a firewall is intrusive in that it blocks the traffic and uses access-based rules, while the Monitor is non-intrusive and uses rule-based evaluation of traffic without impacting such traffic. A firewall is deployed between the outside world and the private network, while the Monitor is deployed between applications and/or between hosts and clients inside private networks. Then, firewalls examine all traffic while the Monitor examines specific traffic, for instance 3270 terminals traffic. With a firewall, alerts are stored internally and shown using proprietary GUI, while with the Monitor an action is connected to the actual operational systems, reporting, emails, BPM, etc. Finally, with a firewall traces are stored in the form of stream of bytes which are not directly unreadable, while with the Monitor traces are true application images, compressed and encrypted to secure privacy and efficiency.

Various system configurations can be implemented with the Monitor. Thus, FIGS. 1-6 illustrate a number of system configurations in accordance with the principles and various embodiments of the present invention.

FIG. 1, is a system architecture diagram showing top-level details of a Monitor interconnected between hosts and clients. In this system configuration 10, the Monitor 11, is located in front of the host system 12. Examples of host systems include mainframes such as the iSeries or IBM 3270/5250 or midrange such as the AS/400. Because the Monitor 11 impersonates the host 12, client applications such as emulators 15 (unknowingly) access the Monitor via the host's IP address. Indeed, the Monitor establishes a connection with the host system for each client session that connects to it.

It is noted the client sessions can be recoded in memory such as disk (e.g. RAID). Then if the rule or action call for it, a session can be replayed to discover the particular activity or trend of interest.

As can be seen by the up-down arrows, the data streams directly between the clients and host without interference from the Monitor 11. Then, in a separate thread which, optionally, involves another CPU or server, a copy of the data stream is obtained and evaluated (as shown by the left-to-right arrow). Using a 1-bit delay fall-through traffic engine 18 and an application analyzer 19, the Monitor obtains and analyzes, in real time, the data streams relative to the protocol being employed (e.g., 3270 or 5250). User activity represented within these data streams is examined by the application analyzer 19 using a rule-based evaluation. The rules are expressed in XML (extensible markup language) format 20 where they are created at planning time 22 by the user or system administrator directly from the application user interface. The real time actions engine 21 is prompted into a predefined action when a rule-based evaluation returns a TRUE condition evaluation result. The action engine 21 commences the action substantially without delay, with the exception of CPU wait time to give priority to a connection task. Therefore, the rules evaluation and action are said to be handled virtually in real time.

For performing the predefined action, such as remote notification, reporting, security alert, or saving to a log file, the actions engine receives all the necessary information about the activity that triggered it. This information includes the session information and the triggering activity information along with information on the condition associated with it. Thus, in essence, the Monitor described above can be viewed as having three functional engines: a traffic capture engine, a rules analysis engine and an actions engine.

In this configuration, the Monitor is deployed for working with servers such as the Red Hat Enterprise, Linux, IBM Host-Publishing, Microsoft HIS, and Microsoft Windows 2003 servers. Optionally, the Monitor is provided with code that includes a complete installation script, recovery procedures, and backup and restore utilities. The Monitor is further deployed with capacity to hold hundreds of concurrent sessions and hundreds of rules applicable to tens of different recognizable items such as application screens. For the database and file reporting actions the Monitor is provided in a system with a large RAM (e.g., 2 GB), a large cache (e.g., 2 MB), two redundant power supplies and a networking card (or a Giga network interface). The activity log file records the data in ciphered format using an encryption algorithm (e.g., 64/128 bit encryption). The foregoing configuration is scalable for allowing more rules, additional sessions, etc.

Figure 2:
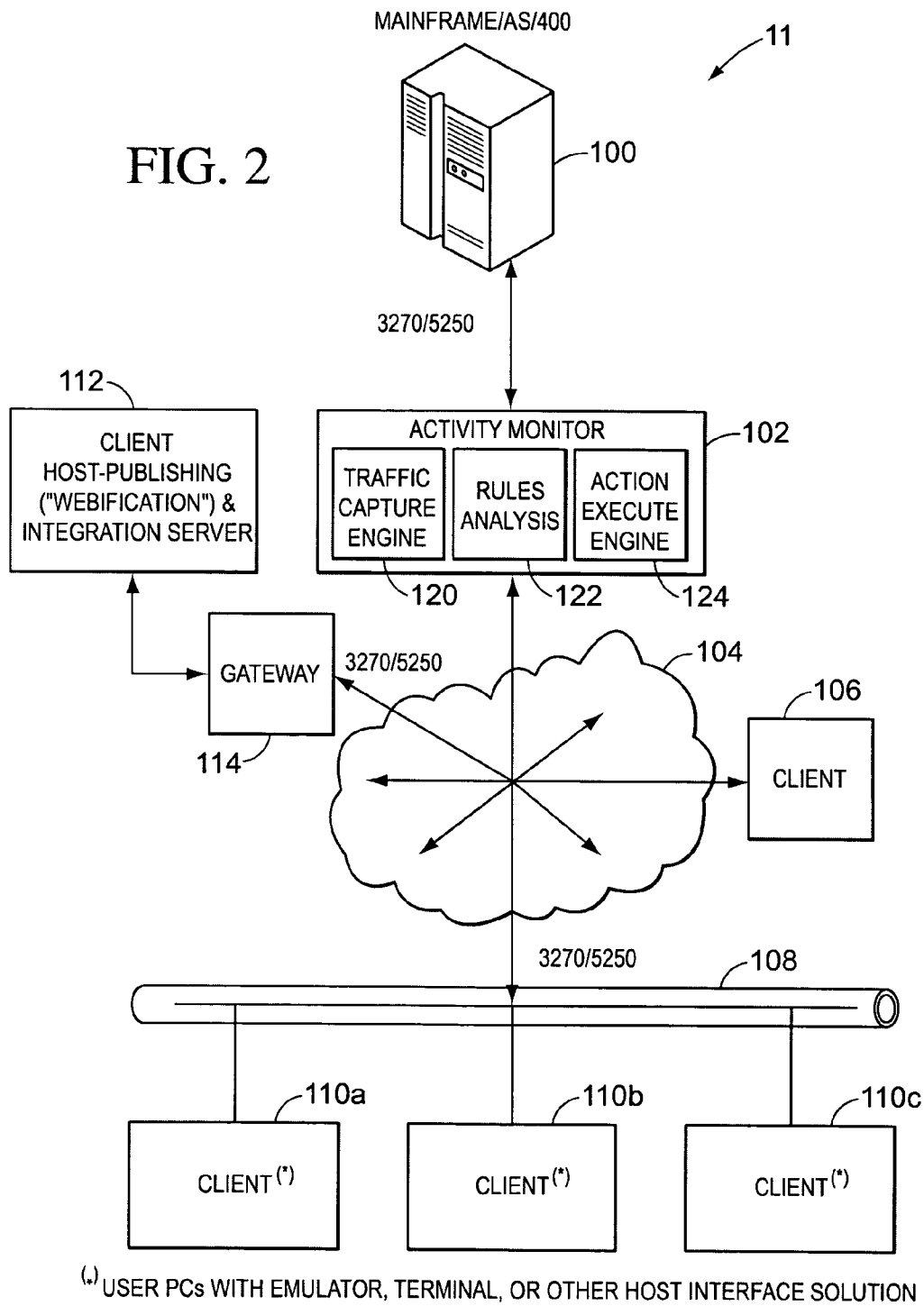
FIGS. 2-6 illustrate various embodiments of an activity monitoring and reporting system.
Figure 3:
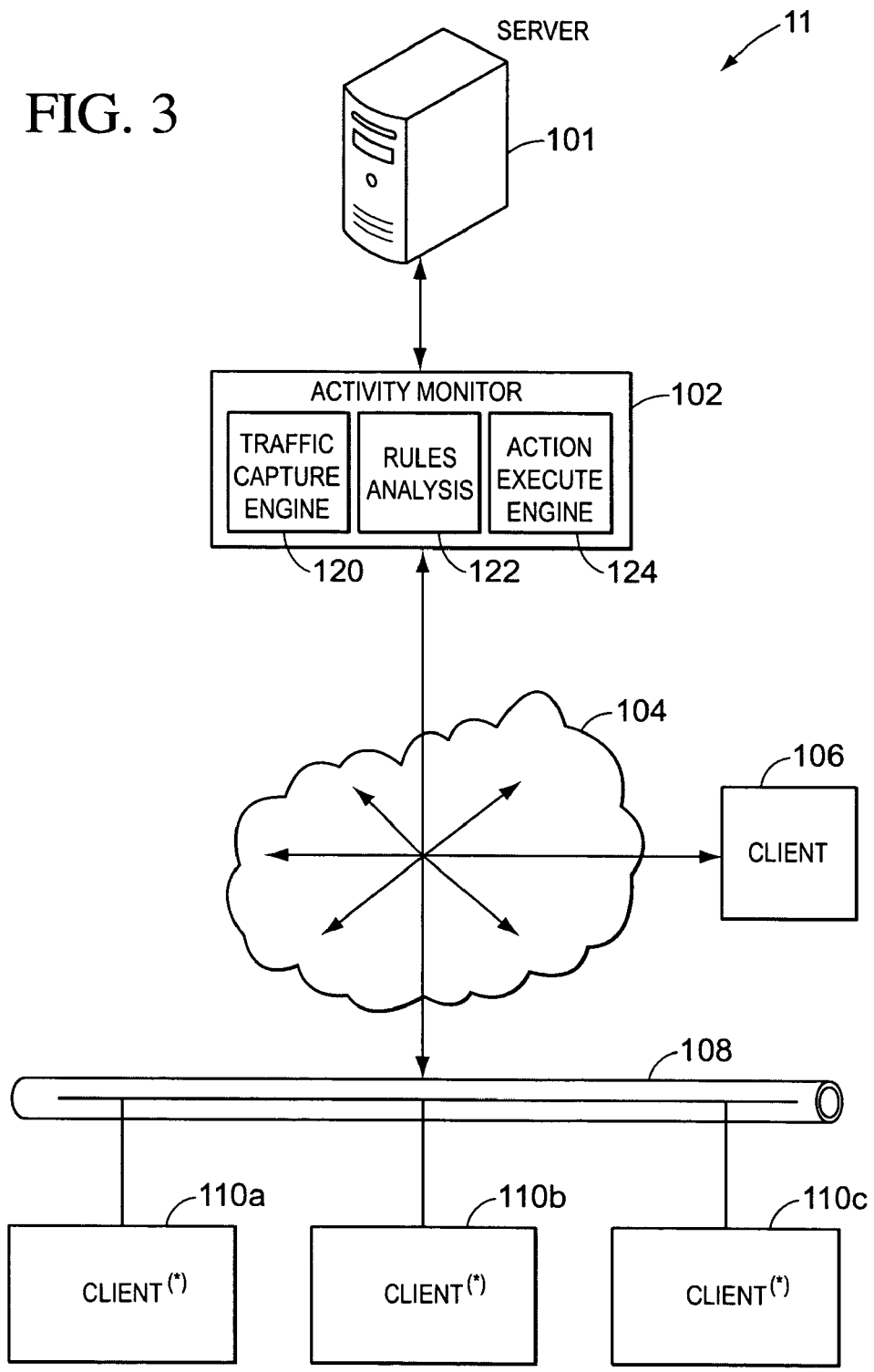

FIGS. 2 and 3, show in more general terms various implementation which are possible in accordance with the principles of the present invention and which apply to client-host communications using emulators as described above. In one instance, the so called 'application layer firewall,' or Monitor as it is referred to here, is akin to a proxy gateway that is deployed between the user's emulator and the host (although in reality it is installed as a software program on the server which embodies the host). To the clients the Monitor looks like the host and to the host the Monitor looks like the clients. As illustrated, the host can operate under any type of operating system in a mainframe (100, FIG. 2) or a server (101, FIG. 3). In the shown embodiments, the Monitor 102 includes a traffic capture engine 120, a rules analysis engine 122, and an action execution engine 124. The traffic capture engine 120 parses the communications based on the particular protocol to extract the information payload. The rules engine 122 evaluates the parsed communications based on the rules, and the actions engine 124 performs an action in connection with the targeted communication.

The monitor can work in the presence of any operating system and, in this way, the Monitor is indeed platform independent. The Monitor can handle 3270/5250 protocols or it can add a plug-in for accommodating another protocol such as JDBC (database access protocol), libRFC and RC (remote function calls), web services (SOAP/WS protocol), HL7, HTTP, and others. A protocol plug-in is a software module that 'teaches' the traffic capture engine 120 in the Monitor 102 to parse new types of communications (protocols and formats). The plug-in applies also to a design-time tool (not shown) that allows the end-user to view their applications screens the way they normally would, and at the same time attach rules to various screen locations in it.

As a proxy gateway, the Monitor 102 does not disturb the communication with the host. The Monitor sniffs (acquires a copy) but otherwise lets through all communications that flow between the host and the user's computer. With the rules engine 122, the Monitor applies the rules to the parsed communications to detect targeted communications. To this end, the Monitor holds in the rules engine 122 a set of instructions, rules, that instruct it what to look for and what to do with the traffic it observes. For a targeted activity that meets a parameter of one of the rules, the Monitor recognizes the location (host, application, screen) at which a user is in and, in connection with this activity, the Monitor checks for other values of fields that the user's communications provided. It evaluates these values against pre-set conditions, and if the entries are deemed to meet the conditions in the rule, this finding triggers the required action, which is also specified inside the instructions.

For each scenario, there are various conditions that represent a threshold, an irregularity, a point of interest or a risk that are defined by the rules. The rules can apply to multiple screen "locations" in the application by specifying a common locator indication, thereby creating a "family" of screen elements to be monitored and analyzed subject to a predetermined rule criteria. For example, every screen that has the phrase "enter command:" should be checked for a user-typed command that includes "explosives." With the Monitor, the user can define, at planning time, the conditions under which an activity will be checked against a rule. Such conditions can include the direction in which communications should be check in (client-to-host, host-to-client or bidirectional).

The principles of the present invention allow easy definition of such conditions through user interface. Furthermore, the list of possible conditions is extendable, and new rule types can be added by using the Java-Reflection or a similar mechanism to add new code to an existing working system. The new code can be referenced via an XML file, or a BPEL-WS format can be used as the XML schema. The addition is visible to a rules planning-time tool in the system, and the XML code contains instructions such as how to build the user-interface for the new conditions. The new rules, incorporated in an XML instruction file, are loaded onto the Monitor for their subsequent run-time application to program usage events.

The Actions to be performed by the action execute engine 124, when a condition inside a rule is met, are extendable in the same way that conditions are. The system includes a wide range of pre-defined actions such as: write to a file; write an entry to a database; call a web-service; interact with a process schema; notify a monitoring tool via SNMP (MIB) or other means; send an email; send SMS; update a dashboard; record any further activities for this session; activate a business process; plug into an EAI (enterprise application interface) bus; report to a fraud detection system or to a fraud detection system; report to an activity or audit log (who, where, what, when); send a JMS message; send a message to a TP (Transactional Processing) server (such as MQSeries, MTS, JMS etc.); re-play activities log; and record this session from now on to an encrypted (ciphered) and compressed location.

Moreover, if one were to add new code to the server which defines, for instance, a new action, this code can be added as a module (packaged as a JAVA, C, or C++ module). The new 'action' module can be referenced in an XML instruction and put to the test through a certification program to verify that it works as intended and does not interfere with the operation of other rules or adversely effect the server. Once such module is certified, the reference to it can be dynamically added to the planning (design time) tool and run time engine of the Monitor. In other words, the set of rules, conditions and actions can be modified or extended dynamically.

Incidentally, in order to "teach" the firewall a new rule one would have to understand technical terms like port, protocol, packets etc. By contrast, the Monitor advantageously allows the user to simply use the original application and define the rules, conditions and actions on the fly. Those rules are then saved and can be uploaded to the Monitor as an XML file and be effective immediately. Here are few examples of XML files with rules and action definitions.

Action Description File Sample:

```xml
<?xml version="1.0" ?>
<actions>
  <dynamicaction type="com.netmanage.OnWebIT.navigator.common.SendMail" name="Send Mail"
  description="When the action is performed, will send an email to the designated person/people." >
    <parameter type="string" name="to" description="Use a ';' or a ',' as a seperator between email addresses."></parameter>
    <parameter type="string" name="from" description="Use a ';' or a ',' as a seperator between email addresses."></parameter>
    <parameter type="string" name="subject" ></parameter>
    <parameter type="string" name="body" ></parameter>
    <parameter type="string" name="smtp-server" ></parameter>
  </dynamicaction>
</actions>
```

Condition Description File Example:

```xml
<?xml version="1.0" ?>
<condition type="com.netmanage.OnWebIT.navigator.common.InStringList" name="In String List"
Description="Looks first in second based on seperator. Supports trimming and ignorecase">
  <parameter type="string" name="first" />
```

-continued

```
    <parameter type="string" name="second" />
      <parameter type="boolean" name="ignorecase"><![CDATA[true]]></parameter>
      <parameter type="string" name="delimiter"><![CDATA[,]]></parameter>
      <parameter type="boolean" name="trim"><![CDATA[true]]></parameter>
  <text>
      <![CDATA[In String List]]>
    </text>
</condition>
```

Rule File:

```
        <?xml version="1.0" encoding="us-ascii"?>
<nav:screen xmlns:nav="http://wwww.netmanage.com/NAV" columns="80" rows="24"
fieldCount="44"xmlns:xsi="http://www.w3.org/2001/XMLSchema-instance"
xsi:schemaLocation="http://wwww.netmanage.com/NAV
.\schemas\NavigatorScreenXML_Schema.xml" name="NewCustomerScreen">
        <nav:cursor column="22" row="9" />
        <nav:fields>
            <nav:field name="field--1--1" attribute="1" color="blue" column="1" row="1"
length="2"><![CDATA[ ]]></nav:field>
            <nav:field name="field-1-3" attribute="1" color="white" column="4" row="1" length="5"><![CDATA[
File]]></nav:field>
            <nav:field name="field-1-9" attribute="1" color="white" column="10" row="1"
length="71"><![CDATA[ Help                          ]]></nav:field>
            <nav:field name="field-2-1" attribute="1" color="blue" column="2" row="2"
length="80"><![CDATA[--------------------------------------------------------------- ]]></nav:field>
            <nav:field name="field-3-2" attribute="1" color="blue" column="3" row="3"
length="27"><![CDATA[NEW                                          ]]></nav:field>
            <nav:field name="field-3-30" attribute="1" color="blue" column="31" row="3"
length="131"><![CDATA[New
Customer]]></nav:field>
            <nav:field name="field-5-2" attribute="1" color="green" column="3" row="5"
length="79"><![CDATA[Add the details then press Enter to validate the data. Then use the
]]></nav:field>
            <nav:field name="field-6-2" attribute="1" color="green" column="3" row="6"
length="160"><![CDATA[Save option in the File pull-down to store
it.                                                                     ]]></nav:field>
            <nav:field name="field-8-3" attribute="1" color="green" column="4" row="8"
length="17"><![CDATA[Account Number :]]></nav:field>
            <nav:field name="field-8-21" attribute="1" color="turquoise" column="22" row="8"
length="32"><![CDATA[00000246                      ]]></nav:field>
            <nav:field name="field-8-54" attribute="1" color="green" column="55" row="8"
length="28"><![CDATA[Allocated by System         ]]></nav:field>
            <nav:field name="field-9-3" attribute="1" color="green" column="4" row="9"
length="17"><![CDATA[Surname . . . . ]]></nav:field>
            <nav:field name="field-9-21" attribute="1" color="turquoise" column="22" row="9"
length="20"><![CDATA[              ]]></nav:field>
            <nav:field name="field-9-42" attribute="1" color="blue" column="43" row="9"
length="40"><![CDATA[                          ]]></nav:field>
            <nav:field name="field-10-3" attribute="1" color="green" column="4" row="10"
length="17"><![CDATA[First Name . . .]]></nav:field>
            <nav:field name="field-10-21" attribute="1" color="turquoise" column="22" row="10"
length="20"><![CDATA[            ]]></nav:field>
            <nav:field name="field-10-42" attribute="1" color="blue" column="43" row="10"
length="40"><![CDATA[                          ]]></nav:field>
            <nav:field name="field-11-3" attribute="1" color="green" column="4" row="11"
length="17"><![CDATA[Address . . . . ]]></nav:field>
            <nav:field name="field-11-21" attribute="1" color="turquoise" column="22" row="11"
length="30"><![CDATA[                    ]]></nav:field>
            <nav:field name="field-11-52" attribute="1" color="blue" column="53" row="11"
length="30"><![CDATA[                    ]]></nav:field>
            <nav:field name="field-12-3" attribute="1" color="green" column="4" row="12"
length="17"><![CDATA[Town . . . . .]]></nav:field>
            <nav:field name="field-12-21" attribute="1" color="turquoise" column="22" row="12"
length="20"><![CDATA[            ]]></nav:field>
            <nav:field name="field-12-42" attribute="1" color="blue" column="43" row="12"
length="40"><![CDATA[                          ]]></nav:field>
            <nav:field name="field-13-3" attribute="1" color="green" column="4" row="13"
length="17"><![CDATA[County . . . . ]]></nav:field>
            <nav:field name="field-13-21" attribute="1" color="turquoise" column="22" row="13"
length="20"><![CDATA[            ]]></nav:field>
            <nav:field name="field-13-42" attribute="1" color="blue" column="43" row="13"
length="40"><![CDATA[                          ]]></nav:field>
            <nav:field name="field-14-3" attribute="1" color="green" column="4" row="14"
length="17"><![CDATA[Postcode . . . ]]></nav:field>
            <nav:field name="field-14-21" attribute="1" color="turquoise" column="22" row="14"
length="10"><![CDATA[    ]]></nav:field>
            <nav:field name="field-14-32" attribute="1" color="blue" column="33" row="14"
length="50"><![CDATA[                                ]]></nav:field>
            <nav:field name="field-15-3" attribute="1" color="green" column="4" row="15"
length="17"><![CDATA[Credit Limit . ]]></nav:field>
```

-continued

```
        <nav:field name="field-15-21" attribute="1" color="turquoise" column="22" row="15"
length="4"><![CDATA[ ]]></nav:field>
        <nav:field name="field-15-26" attribute="1" color="blue" column="27" row="15"
length="56"><![CDATA[                                          ]]></nav:field>
        <nav:field name="field-16-3" attribute="1" color="green" column="4" row="16"
length="17"><![CDATA[Account Status ]]></nav:field>
        <nav:field name="field-16-21" attribute="1" color="turquoise" column="22" row="16"
length="1"><![CDATA[]]></nav:field>
        <nav:field name="field-16-23" attribute="1" color="blue" column="24" row="16"
length="59"><![CDATA[                         ]]></nav:field>
        <nav:field name="field-17-3" attribute="1" color="green" column="4" row="17"
length="17"><![CDATA[Comments . . . ]]></nav:field>
        <nav:field name="field-17-21" attribute="1" color="turquoise" column="22" row="17"
length="30"><![CDATA[                              ]]></nav:field>
        <nav:field name="field-17-52" attribute="1" color="blue" column="53" row="17"
length="48"><![CDATA[                                ]]></nav:field>
        <nav:field name="field-18-21" attribute="1" color="turquoise" column="22" row="18"
length="30"><![CDATA[                              ]]></nav:field>
        <nav:field name="field-18-52" attribute="1" color="blue" column="53" row="18"
length="48"><![CDATA[                                ]]></nav:field>
        <nav:field name="field-19-21" attribute="1" color="turquoise" column="22" row="19"
length="30"><![CDATA[                              ]]></nav:field>
        <nav:field name="field-19-52" attribute="1" color="blue" column="53" row="19"
length="188"><![CDATA[
                                                    ]]></nav:field>
        <nav:field name="field-22-1" attribute="1" color="red" column="2" row="22"
length="159"><![CDATA[
            ]]></nav:field>
        <nav:field name="field-24-1" attribute="1" color="blue" column="2" row="24"
length="81"><![CDATA[F1=Help F3=Exit F10=Actions F12=Cancel
]]></nav:field>
    </nav:fields>
    <nav:formula name="NewCustomerScreen-formula">
        <nav:areaFormula attribute="34234" name="area-2-30" color="blue" column="31" row="3"
columns="12" rows="1"><![CDATA[4e657720437573746f6d6572]]></nav:areaFormula>
    </nav:formula>
    <nav:setVariable name="limit" type="field" attribute="1" color="turquoise" column="22" row="15"
length="4"><![CDATA[field-15-22]]></nav:setVariable>
    <nav:setVariable name="lastName" type="field" attributed="1" color="turquoise" column="22"
row="9"length="20"><![CDATA[field-9-22]]></nav:setVariable>
    <nav:rule name="creditLimitRule" binaryOperator="and">
        <nav:condition name="Condition2000" direction="user2host">
            <nav:operand name="first" type="field" attribute="1" color="turquoise" column="22" row="15"
length="4"><![CDATA[field-15-22]]></nav:operand>
            <nav:operand name="second"
type="integer"><![CDATA[2000]]></nav:operand><![CDATA[com.netmanage.OnWebIT.navigator.co
mmon.GreaterThan]]></nav:condition>
        <nav:action name="Send Mail">
            <nav:operand name="to" type="string"><![CDATA[michaelk@netmanage.co.il]]></nav:operand>
            <nav:operand name="from" type="string" />
            <nav:operand name="subject" type="string" />
            <nav:operand name="body" type="string" />
            <nav:operand name="smtp-server" type="string"
/><![CDATA[com.netmanage.OnWebIT.navigator.common.SendMail]]></nav:action>
    </nav:rule>
</nav:screen>
```

Figure 4A:
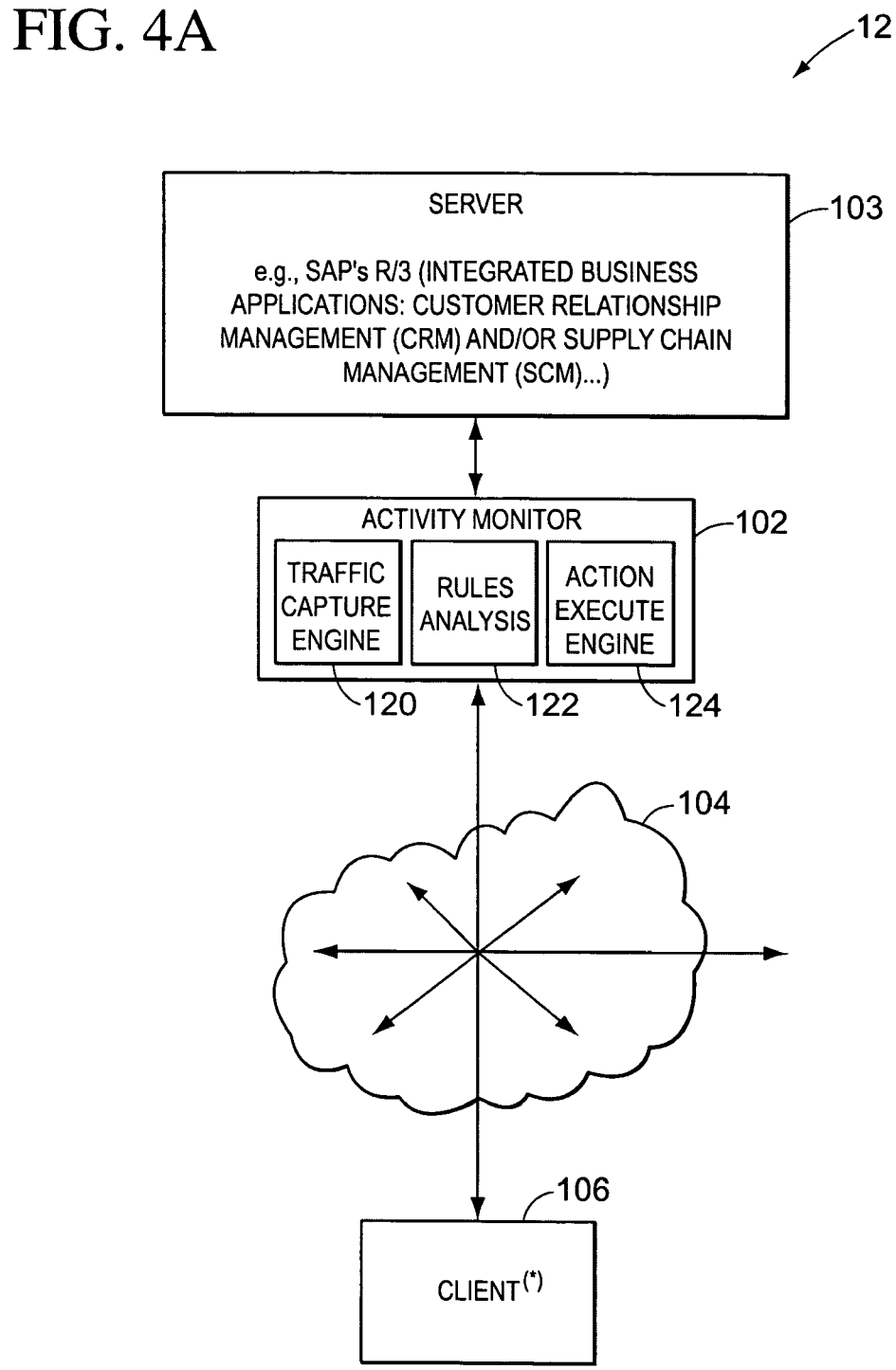

As shown in FIGS. 4A, 4B, 5 and 6, further implementations of a real-time activity monitoring and reporting system are possible. In one such system, depicted in FIG. 4A, a Monitor 102 is deployed between a server 103 and the clients 106, as shown in FIG. 4A. The server 103, e.g., a CRM (customer relations management) program or a SCM (supply chain management) program, is visible via the Monitor 102 to the client 106. The client can be software, such as Java client or SAP client, that runs as a client to a server-based application, or it can be software that runs as a client to a host on a user PC with an emulator or another host interface solution.

Figure 4B:
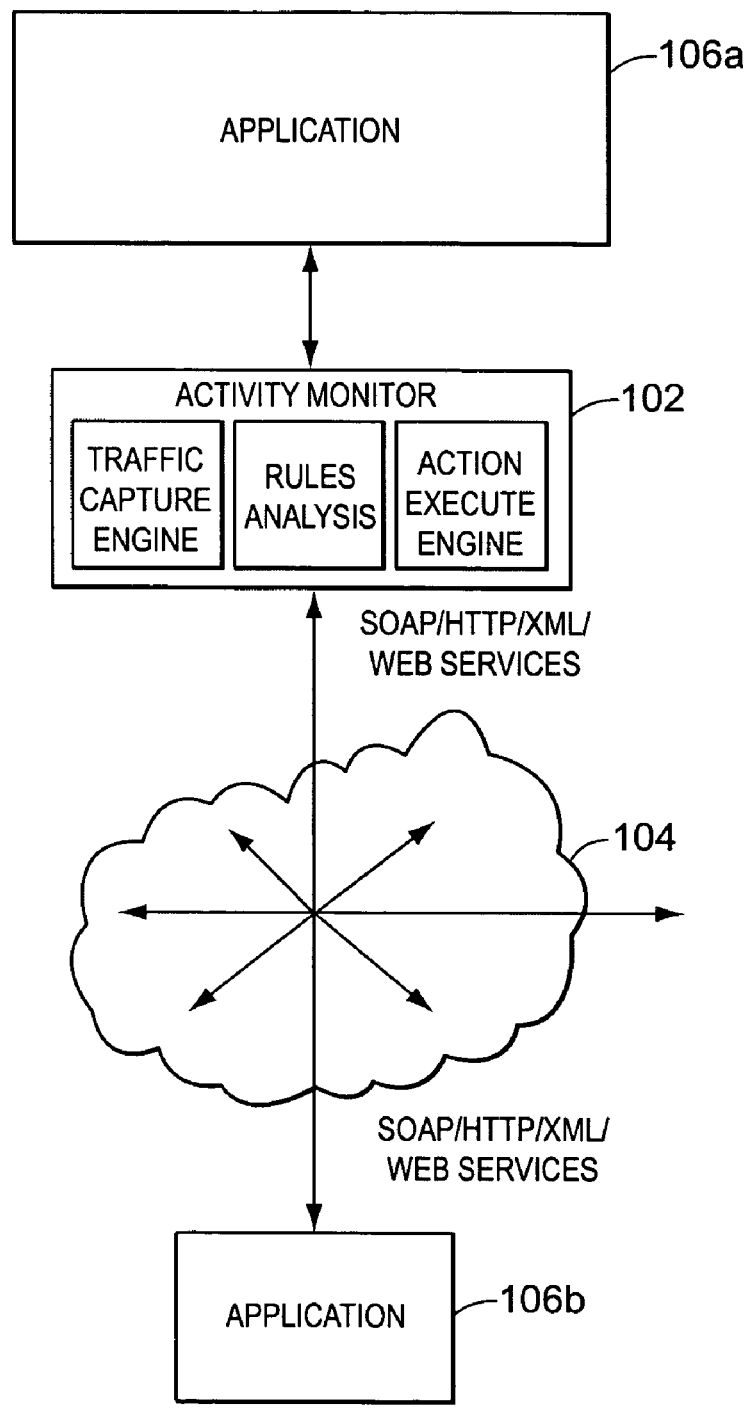

In the system of FIG. 4B, the Monitor 102 is deployed between two applications 106*a* and 106*b* communicating with each other via SOAP or other protocols. Since Web protocols are installed and available for use by all major operating system platforms, HTTP and XML provide an already at-hand solution to the problem of how programs running under different operating systems in a network can communicate with each other. Thus, SOAP (Simple Object Access Protocol) is a way for a program running in one kind of operating system (such as Microsoft Windows 2003) to communicate with a program in the same or another kind of an operating system (such as Linux) by using the World Wide Web's Hypertext Transfer Protocol (HTTP) and its Extensible Markup Language (XML) as the mechanisms for information exchange. SOAP specifies how to encode an HTTP header and an XML file so that a program in one computer can call a program in another computer and pass it information. SOAP It also specifies how the called program can return a response. The Monitor provide the activity monitoring and reporting utility with its traffic capture, rules analysis and actions engines 122, 122 and 124, respectively.

Figure 5:
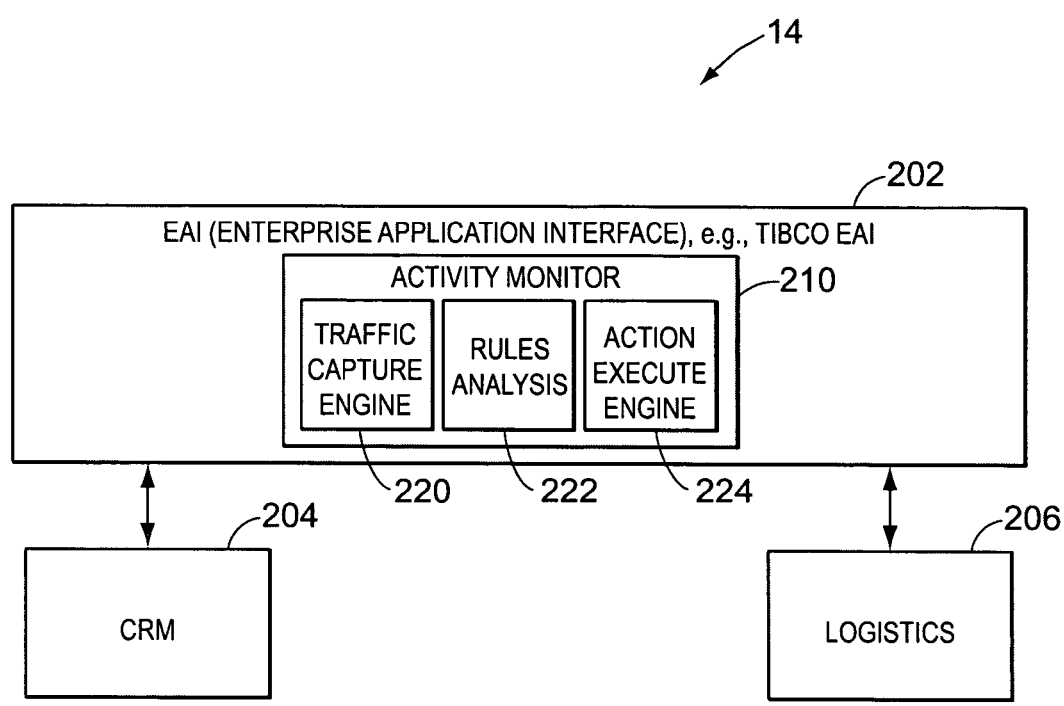

As shown in FIG. 5, the Monitor is deployed in an enterprise application interface (EAI) bus between two applications. For instance, the Monitor 210 is deployed in a Tibco EAI bus 202 between CRM and a Logistics applications, 204 and 206. In this configuration the Monitor 210 includes the traffic capture, rules analysis and action engines, 220, 222, 224, respectively. Thus the Monitor 210 can sniff all communications between these applications as it crosses through the EAI bus but without interfering with the flow of communication. On finding targeted communications, based on the rules, the Monitor can provide the action selected for such communications.

Figure 6:
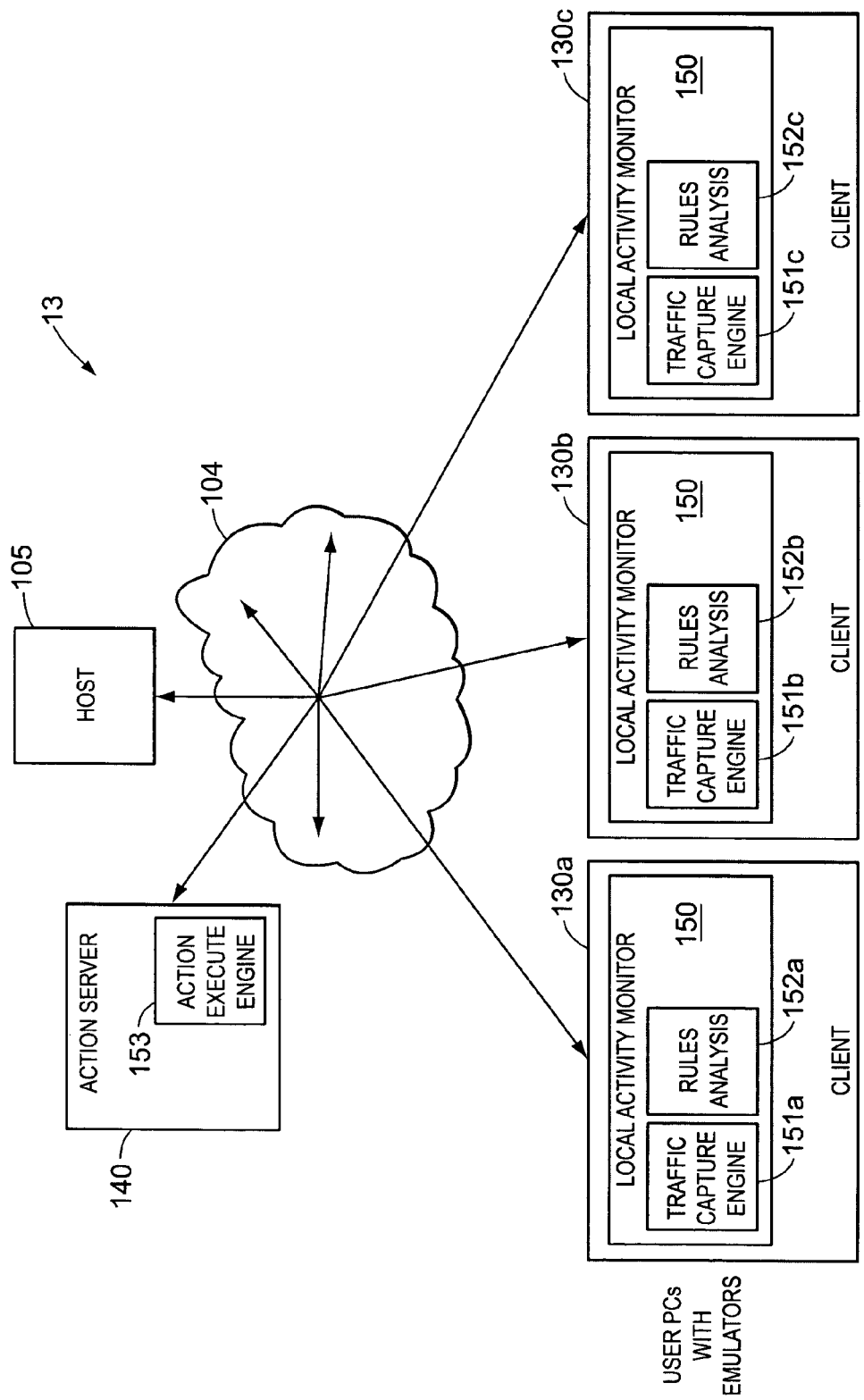

In yet another implementation, as shown in FIG. 6, a system with a Monitor include separation of the duties, allowing separate machines to perform separate actions. FIG. 3 shows deployment of the Monitor 150 as a local proxy, a local client software component where traffic through the various layers of the operating system is sniffed by this software without actually interfering with the flow of such communications. In this implementation, as the local proxy, the Monitor 150 includes the traffic engine and rules engines 151 and 152, respectively, but the actions themselves are offloaded to an action server 140 which includes the action engine 153.

The local Monitor 150 in each user PC 130, is capable of sniffing (obtaining and parsing) the traffic and analyzing it against the rules. If the analysis against the rules produces any indication that communications meet the rules and are therefore targeted, the indication is reported to the action server which then proceeds to act based on the proper action definition for this circumstance (as illustrated above). In other words, the Monitor's reporting action is offloaded to the action server, but it still is responsible for alerting the action server when it detects a targeted communication involving the particular PC on which it resides. All this, of course, is transparent to the user of the PC and the applications running on it.

It is noted that, in any configuration that involves secure communications, the Monitor is capable of maintaining the secure line of communications. For example, Transport Layer Security (TLS) and Secure Sockets Layer (SSL) are an integral part of most Web browsers (clients) and Web servers. SSL and TLS (at the program layer) are protocols for managing the security of a message transmission on the Internet. The "sockets" part of the term refers to the sockets method of passing data back and forth between a client and a server program in a network or between program layers in the same computer. A protocol such as SSL uses the public-and-private key encryption system from RSA, which also includes the use of a digital certificate. Thus, if a Web site is on a server that supports SSL, then SSL can be enabled and specific Web pages can be identified as requiring SSL access. In this case, the Monitor maintains, without compromising, the security status of these web pages.

Moreover, in any type of implementation, one addition to the real time communication tracking and analysis is the substantially instant reporting of targeted activity which such communications may involve. This provides a useful complement to the conventional information management. Indeed, data warehouses provide a central repository for information, solve problems such as data integrity, and provide an easy baseline for building decision support systems (DSS) and OLAP reports. However, the Monitor provides substantially real-time information to complement "batch" oriented data extraction processes. The Monitor allows a dynamic and rapid respond to changes, irregularities, risks, etc. The Monitor also provides access to systems with "less structured" or undefined data structure and access to operations where the underlying system or database in not accessible within a given time frame and knowledge. The Monitor provides the further advantage of allowing the user to define and deliver in minutes new connectivity solutions based on new rules. Additionally, the Monitor allows definition of rules and actions for auditing, based on existing application logic and screens and not only on top of raw database static data.

How then is a rule attached to a screen? A rule is associated with a specific screen, or a specific WS (web service) method, under a specific IP and port (the screens inside a host are assumed to be unique, and if they are not, it is up to the user to change the wait for text pattern to avoid confusion).

It is important to note that management of the rules, including uploading and reloading, via the Monitor is intended to be user-intuitive and one which prevents user mistakes. Thus, the Monitor is designed to meet requirements with this in mind. For instance, new rules can be added to an existing set of rules, and the designer will be updated with the complete set of rules. New rules will be applied to all the sessions that will be established only after they where activated. Activating or re-loading the sets of rules is done from the system administrator's interface (GUI) or console. Every time a change is made to the rule set on the server, a snapshot of "before change" is backed up on disk with a timestamp. Then, when a change is applied, the new version is also backed up to the server disk. In one implementation, the system can hold a backup of 200 versions, and stale versions are erased after a proper alert. The Monitor's rules management will allow, with double confirmation, erasure of up to the last 20 versions, but not the entire list. Preferably, if a rule is deleted this deletion will be relevant only for newly established sessions. After the last session which uses a deleted rule is disconnected, the rule can be released and not used again.

Moreover, in this configuration, the user interface (GUI) will support downloading the history. When the planning (design) time tool connects to a server, it will first download the existing set of rules and will then allow adding new or deleting or browsing existing rules. In any event, there is no down-time to the system.

For selective or partial uploading of rules, the Monitor is further designed with specific instructions to the server to load only certain rules, such as only new rules in a given directory, and to apply them to running sessions.

Note again that rules contain conditions. Specifically, rules contain expressions which combine several (1 or more) atomic conditions connected between them with AND or OR logical operator. A condition test result can be applied with a logical NOT (equivalent to if (!condition(args))). This means that, for simplicity, a condition returns a Boolean value.

Associated with the conditions are values and operators. A condition is related to a set of one (1) or more values that were extracted from a screen property (field or area) or a web service (WS) value, or were entered at design time as literals. This condition will include an operator that operates on the values that are given (Boolean or other operator).

Figure 7:
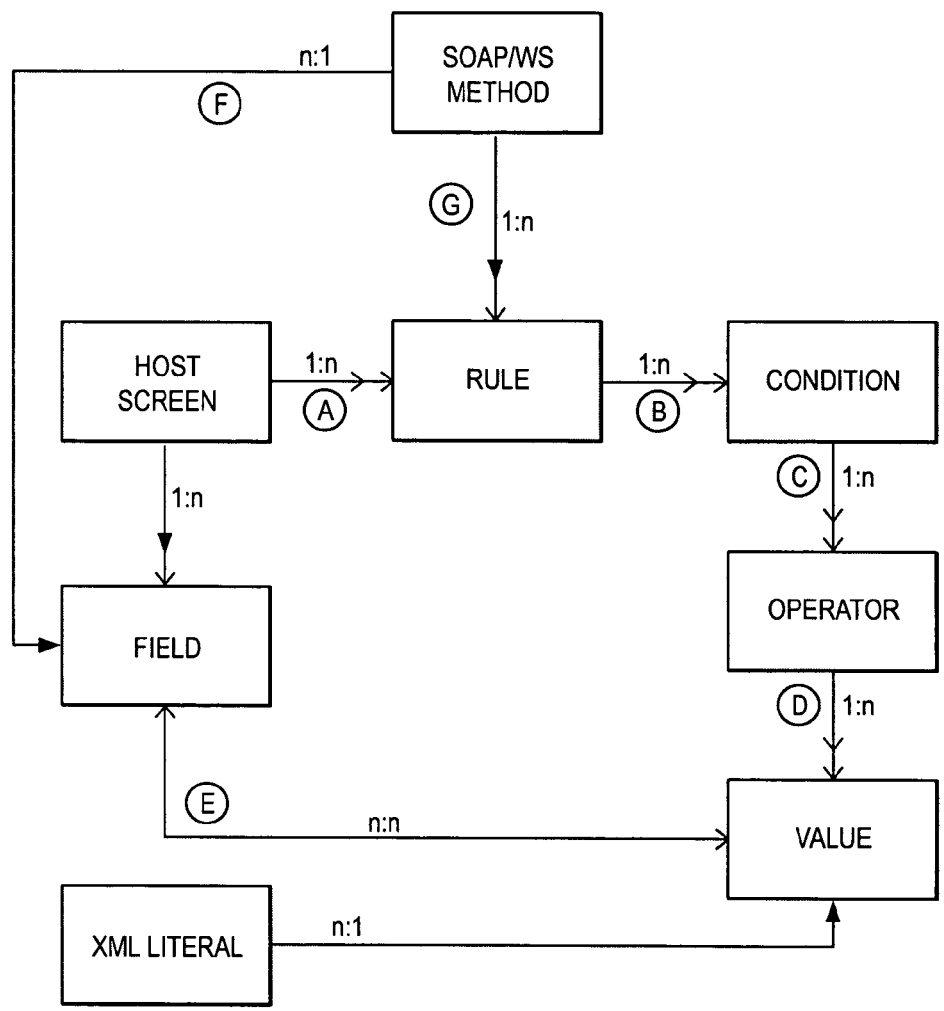
FIG. 7 illustrates the relationship between screens and conditions.
Figure 8:
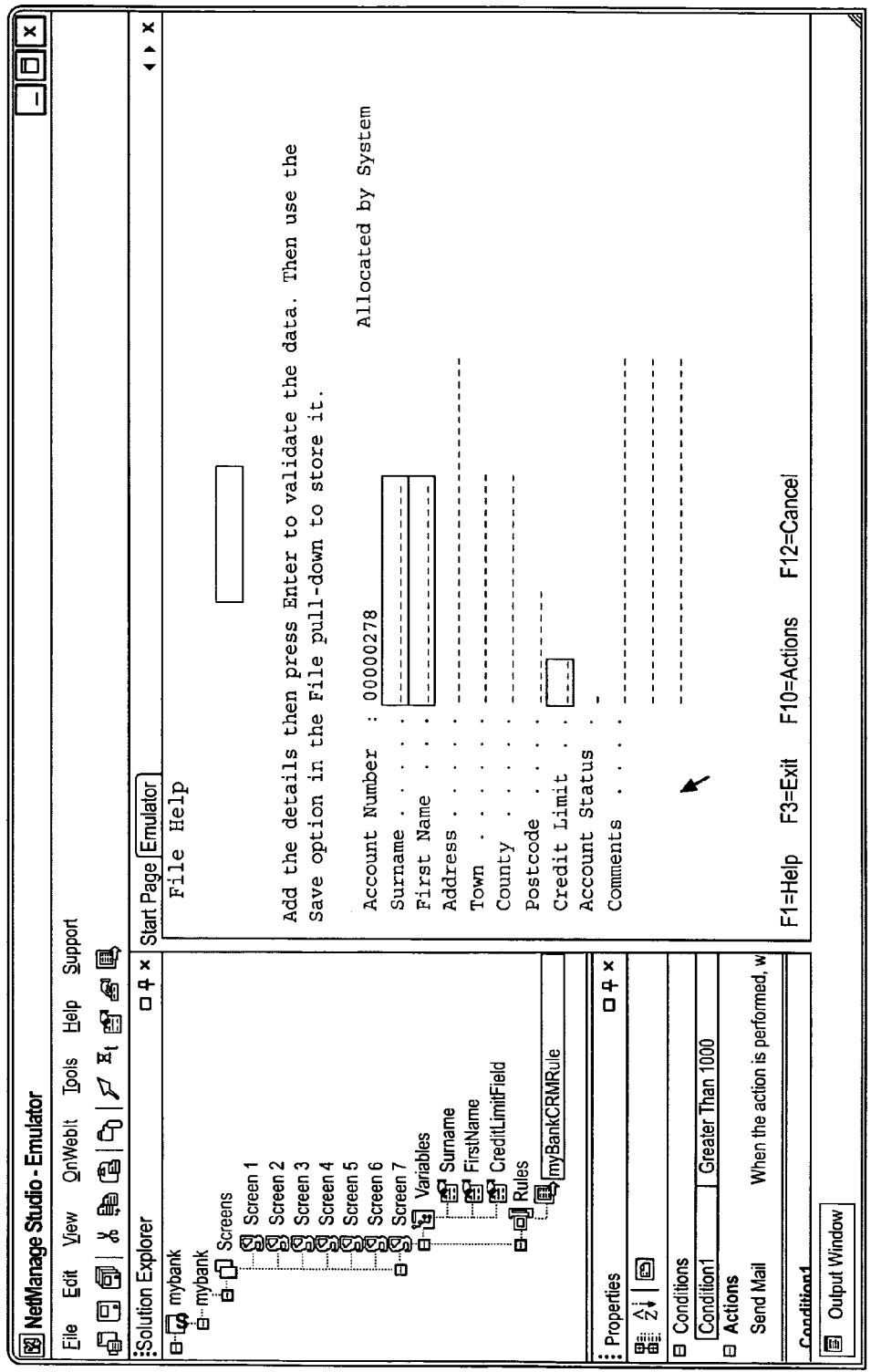

To illustrate, FIG. 7 is a diagram of the relationship between screen/WS and conditions. As shown by indicator 'A', a screen points out to one or more rules, where each rule contains one or more conditions as shown by 'B'. The one or more conditions are connected by logical operator such as AND, OR, etc. (i.e., there is a Boolean operator between the conditions). As shown by 'C', a condition includes a set of operators, where each operator acts on '1' (a unary operator) or other operands. These operands are values fetched from the XML file and from the screens in the session, as shown by 'D' and 'E'. For web service (WS) communications, fields are subject to operators, as further shown by 'E', such that the rules are attached to WS methods/functions/calls the same way they are attached to screens in the host environment, as shown by 'F' and 'G'. To instruct the engine on how to locate a field in a web-service, XPATH into the SOAP structure may be used.

In typical implementations, the Monitor is capable of supporting customizable JAVA conditions. This means that additional condition (JAVA classes) can be developed and added to a server at runtime. The Monitor system will allow adding conditions and operators to the package, both for run-time evaluation and their related design-time "building" GUI.

Rules and conditions have predefined attributes to control evaluation and behavior. Rule attributes are illustrated in the following table.

| ATTRIBUTE | TYPE | DEFAULT VALUE | EXPLANATION |
|---|---|---|---|
| Continue_evaluating_after_turned_true | Boolean | True | When the rule is met (returns true), should we continue evaluating it more? |
| Lmit_number_of_turned_true_times | Integer | 0 = no limit | How many times |

Figure 9:
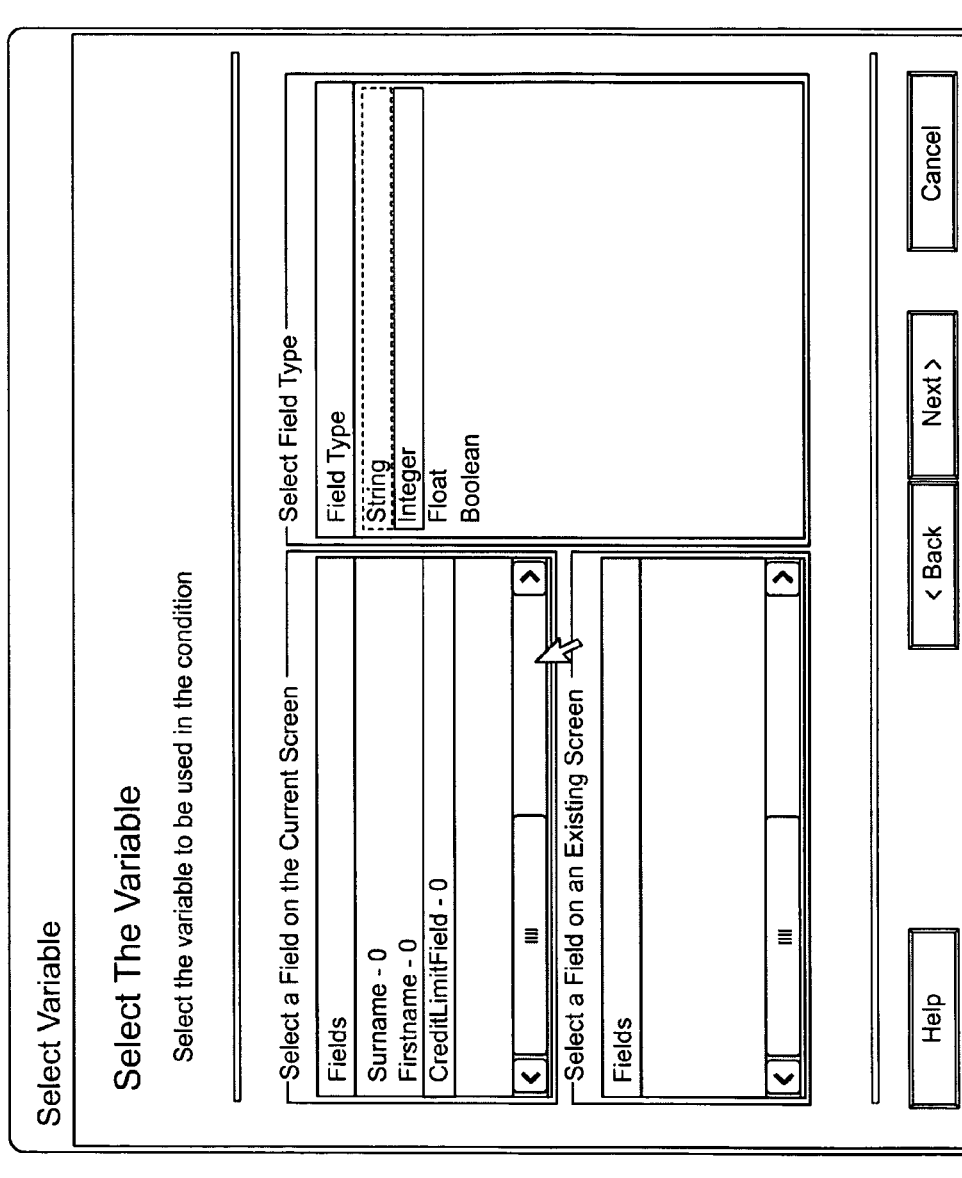
Figure 11:
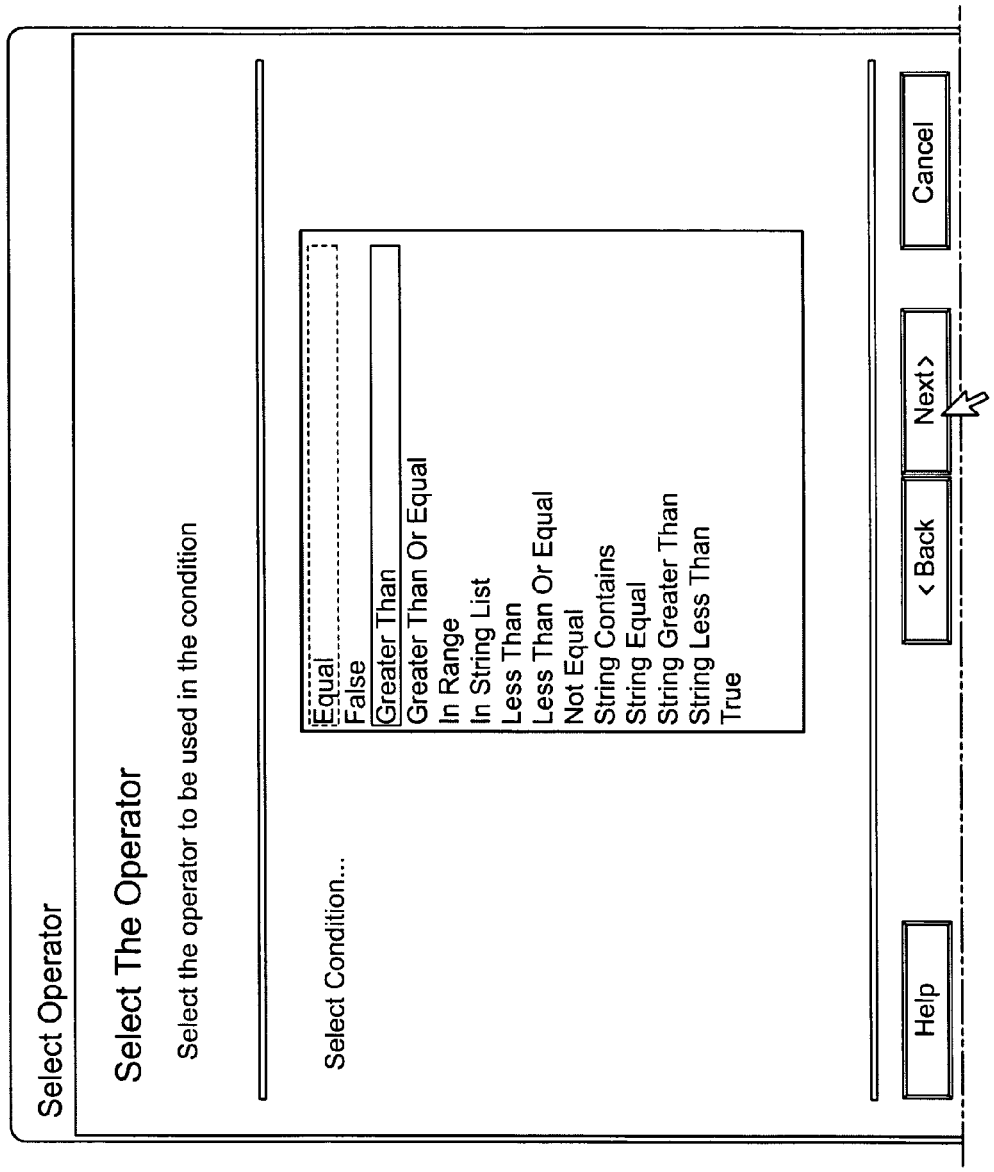
Figure 12:
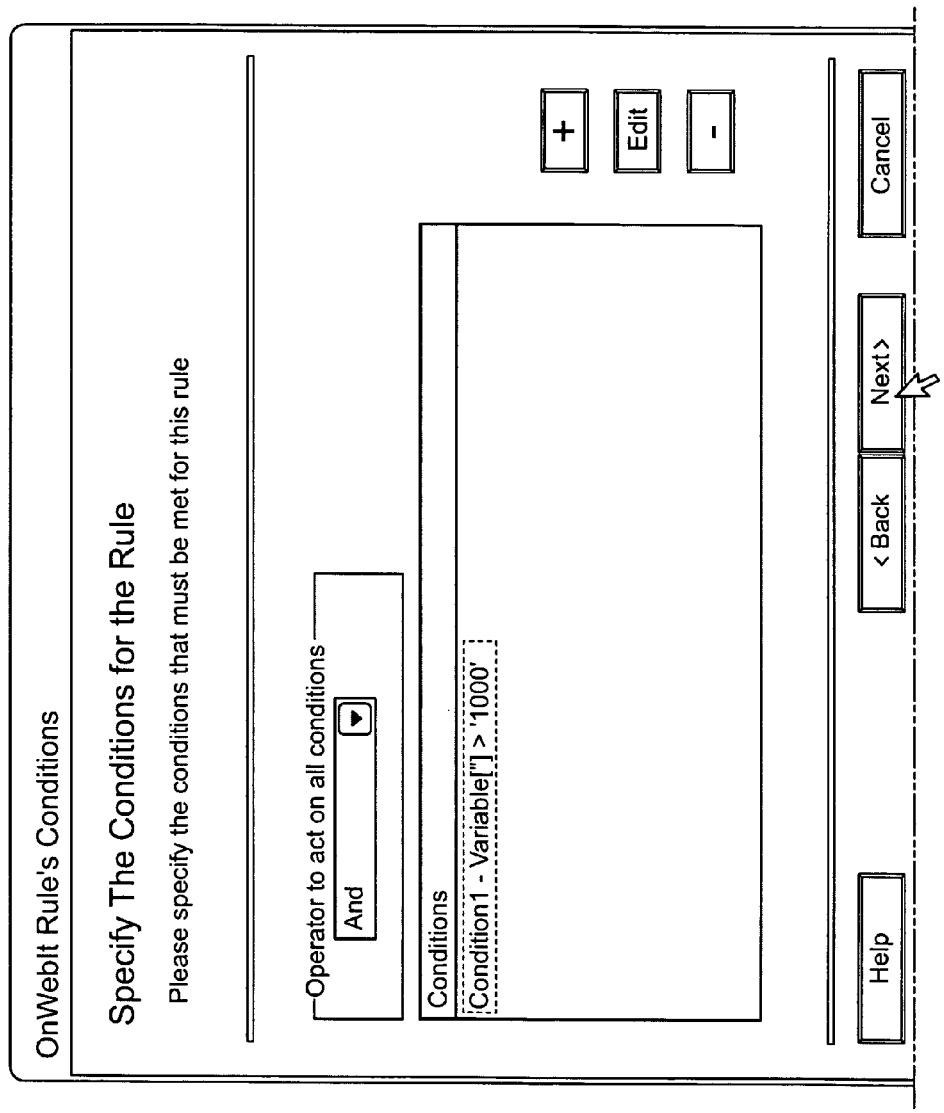
Figure 13:
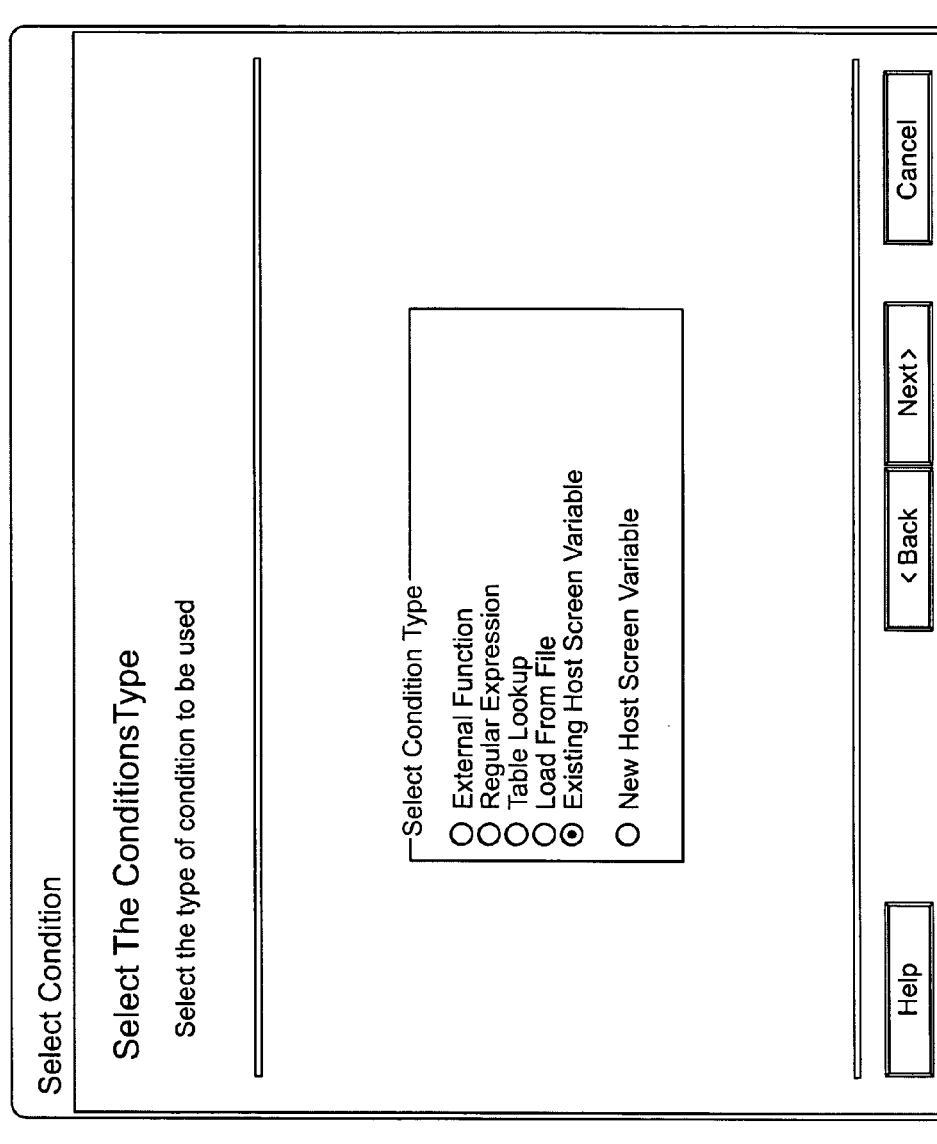
Figure 14:
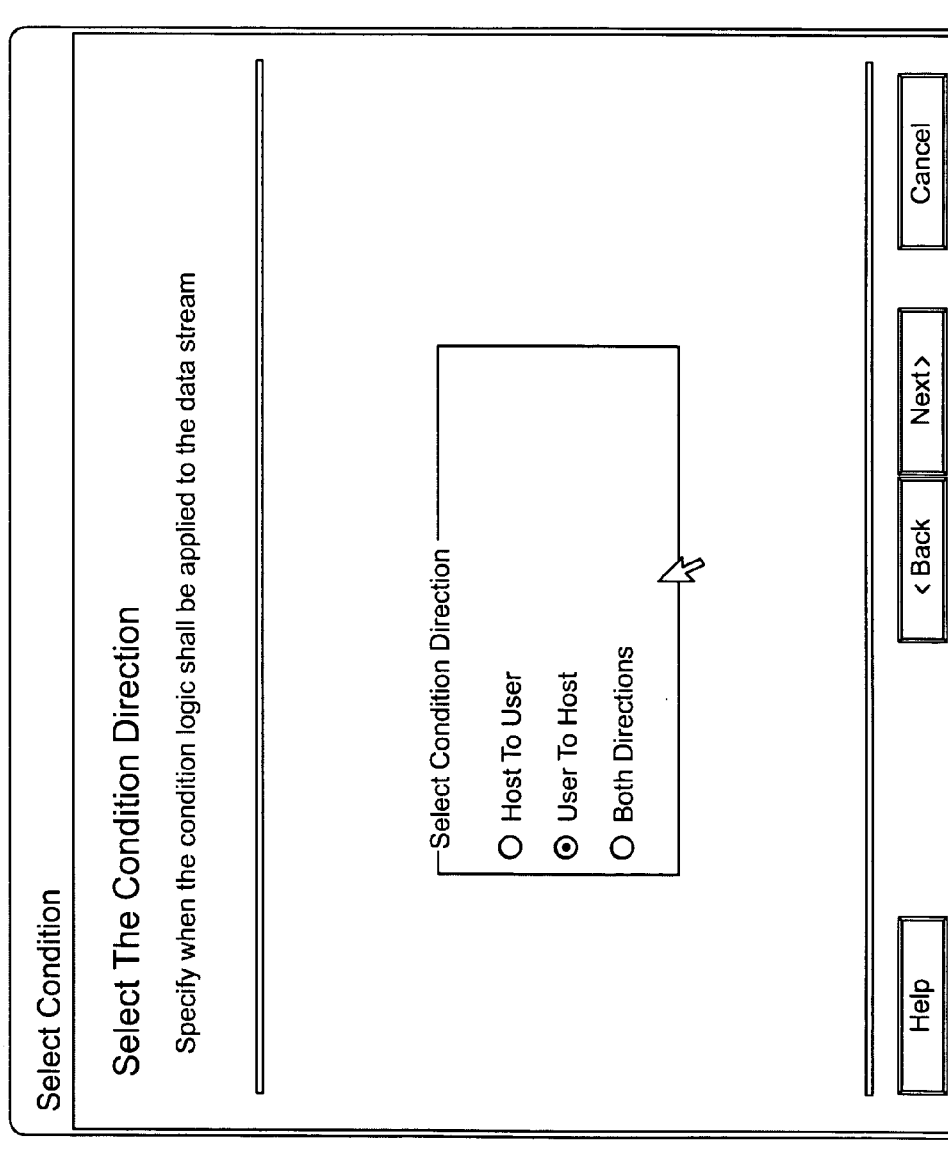
Figure 15:
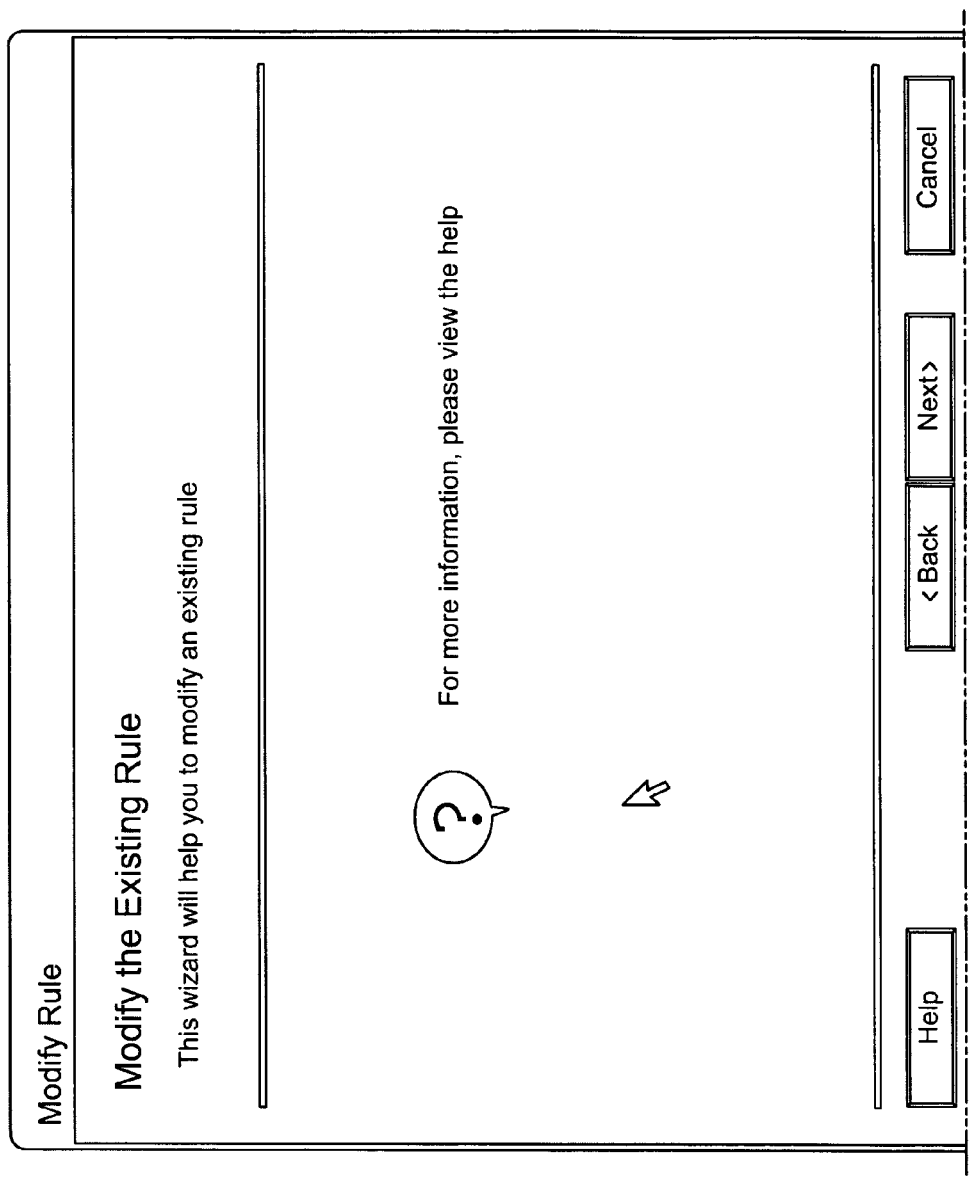

The screen images in FIGS. 8-18 show a possible user interface for defining rules, conditions and actions. The wizard associated with this user interface guides the user through creation of the new rules, conditions and actions. For instance, in FIG. 8 which displays a particular application screen, the wizard allows the user to select and then configure a rule for a particular field on the screen. If, as in this example, the program handles credit accounts, the credit limit is the selected field for which a rule can be established. Once this field is selected, part of the process for defining the rule is selection of the variable, as shown in FIG. 9. Again, in this instance we have selected the "credit limit field" and it is so indicated. Moreover, the field type can be selected and, in this instance, it is "integer," as shown by the highlighted item on the right window in the screen. Next, in FIG. 10, the wizard prompts the user to select the value of the field, where the value is used in the condition. In this example we set the condition to "value=1000." As shown in FIG. 11, the condition is further defined by selecting an operator which is to apply to the condition; here we select the operator "greater than," which means greater than the value=1000. As shown in FIG. 12, the wizard prompts the user to select which conditions the operator should apply to; and it further prompts the user to select among the conditions that pertain to the rule if the operator is to apply to more than one. In this example, however, we show only one condition: "condition1 —variable ["]>1000". Note that the user has the further option of scrolling through and editing any of the selected values as indicated by the "+/−/edit" icons on the screen. In FIG. 13, the wizard prompts the user to select the condition type, say "existing screen variables," and in FIG. 14 the wizards prompts the user to select the direction associated with the condition, namely host-to-user, user-to-host or both directions. The rule just created can be modified as indicated in FIG. 15.

It is noted that, optionally, the rules can be implemented as BPEL (Business Process Execution Language) which is an XML-based language designed to enable task-sharing for a distributed computing or grid computing environment—even across multiple organizations—using a combination of Web services. Using BPEL, a programmer formally describes a business process that will take place across the Web in such a way that any cooperating entity can perform one or more steps in the process the same way.

Figure 16:
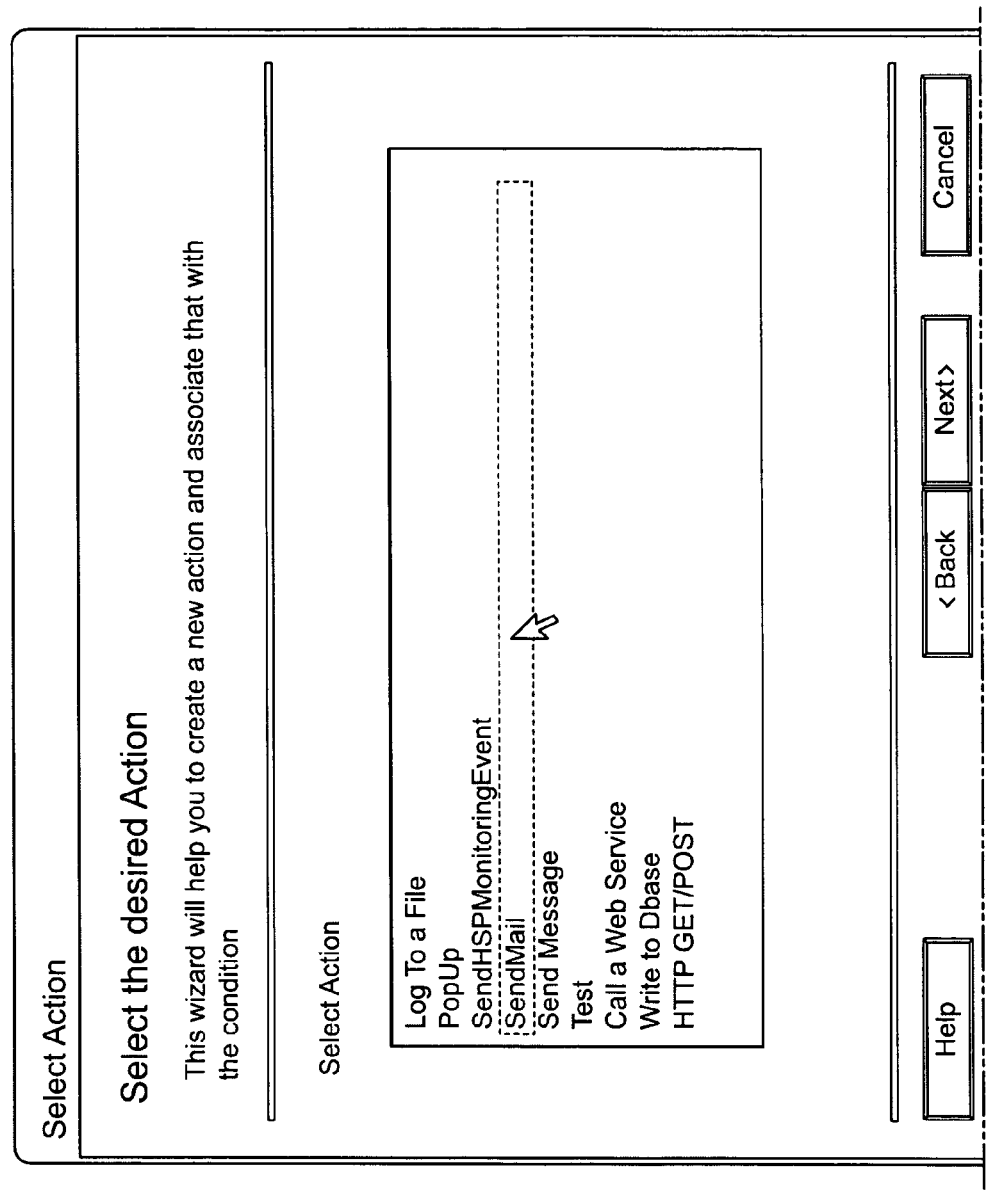
Figure 17:
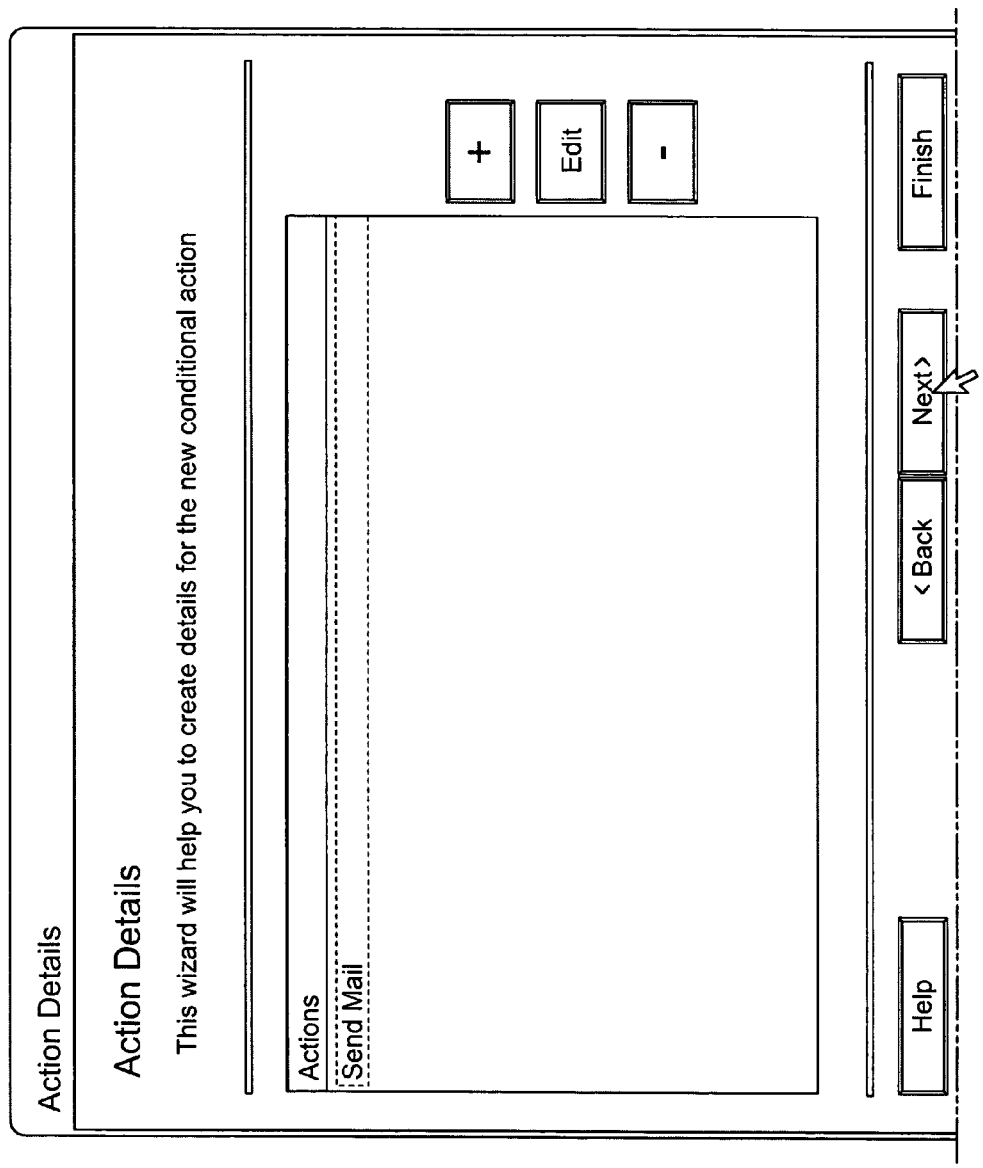
Figure 18:
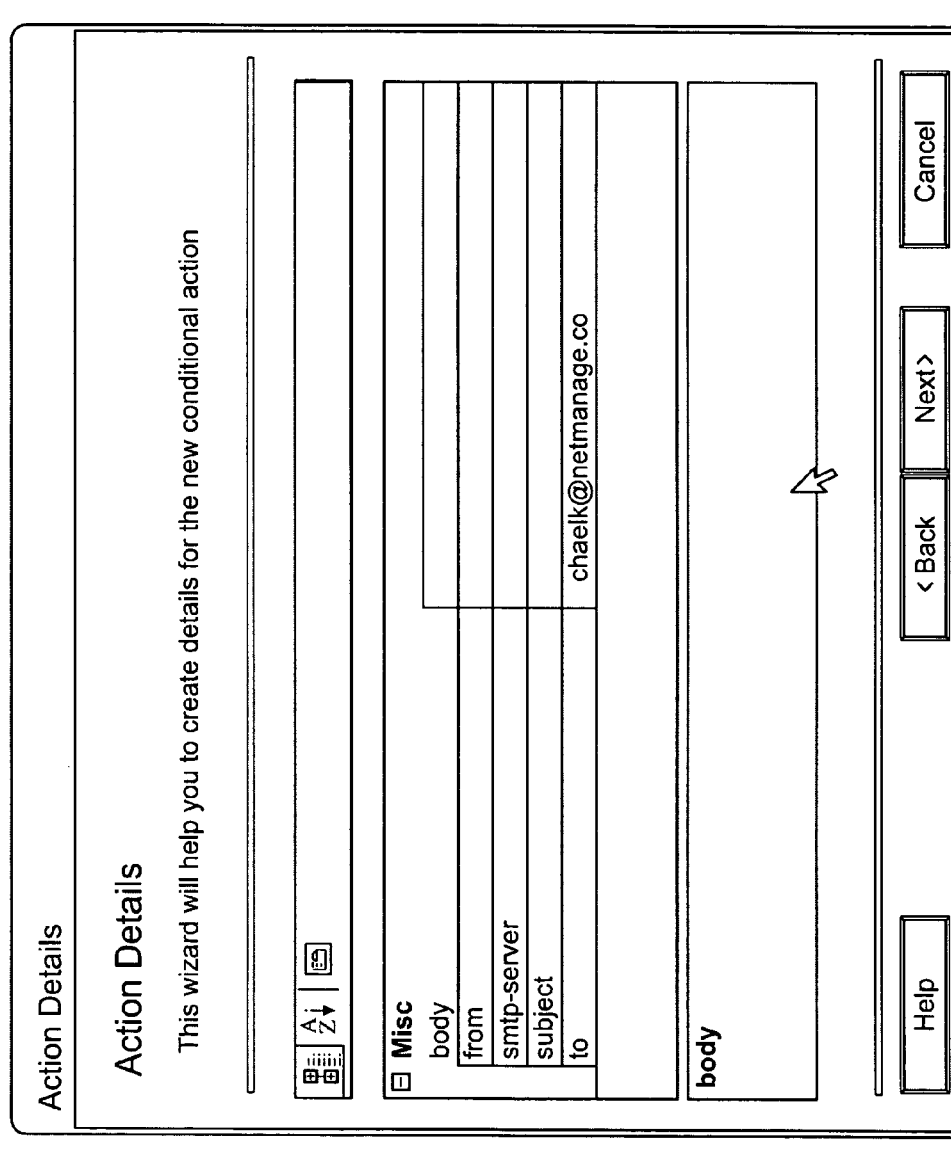

Then, once the rule is defined, FIG. 16 shows how the wizard prompts the user to select the actions which corresponds to this rule. In this case we select "send mail" as the corresponding action, as shown in FIG. 17. The details of this action are further defined as shown in FIG. 18, say, email to chaelk@netmanage.com.

Thus, returning to FIG. 8, the screen provides fields for the user to fill out which emulate the type of fields used by the application in conducting the business of the organization. For instance, for the application that handles credit accounts, as shown, the account number, name and other related fields such as credit limit can be entered. In combination with the condition value="1000" and the action="send mail to chaelk@netmanage.com" from the above-described screens (and as shown on the left side of this screen), such information, including the credit limit, can be compared against the condition (value=1000) and acted upon as instructed if the entered credit limit exceeds the value.

Certain design features illustrate implementation of the foregoing. For instance, the following table illustrates some basic operators that can be included in the design:

| OPERATION | NUMBER OF ARGUMENTS (OPERANDS) | FUNCTIONALITY | EXAMPLE | TREATS ARGUMENTS AS |
|---|---|---|---|---|
| Contains | 2 | Finds value 1 in value 2 | Name contains "kup" | Strings |
| Starts with | 2 | Does value 1 start with Value 2 | Name starts with "Mich" | Strings |
| Ends with | 2 | Does value 1 end with Value 2 | Name ends with "man" | Strings |
| Substring | 4 | Compares string in a specific location (substring) | Name at index 3 at lenth of 2 equals "ha" | String and zero-based-index to first string to argument |
| In | ... (dynamic) | Does value exists in a set of given values | Name in ["Kevin", "Michael", "Assi", "Ido", "Gil", "Eran"] | String |
| > greater than | 2 | Numeric comparison | Value 1 > value 2 | Integer |
| < | 2 | Numeric comparison | Value 1 > value 2 | Integer |

-continued

| OPERATION | NUMBER OF ARGUMENTS (OPERANDS) | FUNCTIONALITY | EXAMPLE | TREATS ARGUMENTS AS |
|---|---|---|---|---|
| = | | | | Integer |
| In | ... | Does value exists in a set of given values | Number in [1, 7, 10] | Integer |
| Between | 3 | Is value between | Number between 1 and 10 | Integer |

Preferably, in such design, numeric operators support integer, long, float and decimal with decimal point values. Also, when passing an argument like a field value, several attributes are supported, including, for instance, white space trimming, leading zeros trimming, to-lower and to-upper, as well as addition of a general parameter to string operands and ignoring case in comparisons. Then, inside a screen XML, a special instruction can be defined to scrap a screen area or field and assign it into a session-variable by name. So, within a single user session, a "bag" of variables (hash-table/map) can exist which will be available for use by condition and actions. Also, an action can assign text and results into a session variable.

As to operands, the values to which a condition can be applied on can be derived from: (1) the current screen (to which the rule is attached); (2) any field from screens visited in this session (in order to allow specific user, based on account number, to check balance even though they are not always in the same screen). This will be available through session variables; (3) any literal from the rule definition (XML); and (4) any system variable (host name/IP etc.). An example of a system variable (taken from the system.xml or web.xml for a server) can be the SMTP server for sending emails. This can be referenced by name to a system variable.

As to condition objects, they serve as the main building blocks for the engine (assuming the engine knows and has a decoder for a given protocol). Conditions should be able to receive values and perform the specific calculation they are built to calculate, based on the parameters (values pass using a mapping XML) and some general attributes specified at design time (like trim etc.). Thus, in addition to basic conditions that use basic operators, there are some "smart" conditions. The following table illustrates the smart conditions:

| CONDITION | DESCRIPTION | SPECIFIC REQUIREMENTS |
|---|---|---|
| Screen visited by specific "client" X times over the last Y minutes | | Requires the engine to track session duration and count individual screen/object recognitions, can be skipped if no conditions are based on time (incoming input from condition manager component) |
| Client visited a sequence of calls/screens in a specific order | | |
| Client visited a set of screen, with no particular order, during the given time frame | | |
| Composite condition that calls other conditions | Compound condition | |
| JAVA customized condition | | |
| Operators Extension Condition | Only used to hold a collection of new operators to be introduced to the system (Plug-in) | |
| User executed a certain keyboard sequence + cursor + on a specific screen | | |

Conditions, rules and actions can have special features. Some conditions will need to do initialization (such as read instructions from their own configuration, connect to a remote system etc.) For this, each condition should have a special method, called by the engine at initialization time, but typically only once (e.g., OnGlobalInitialize). A parallel method (e.g., OnGlobalFinalize) can be defined so as to release resources and it should be called before shutdown or when the engine is instructed to re-load objects.

A condition may have a way to declare itself as reusable, thereby the system will create one instance and reuse it instead of creating a new one for each screen. The same should hold for actions. The administrator will also have an option to instruct the engine to reload objects. This operation will unload all conditions/rules/actions (by calling their OnGlobalFinalize method or similar) and will re-load the entire rules XMLS set and initialize.

An action is the operation to be executed if a rule is applied and met. For example, an action is performed if the rule returns a positive Boolean value (the expression and conditions are met logically). The action is preferably well defined with an interface that receives all the information in the context of the engine, such as the rule and its details, the concurrent information (user, IP of client, server, time when stream came in and so on), a snapshot of the original stream, the data used by the rule, and the state of the connection. This design supports all types of actions, including "out-of-the-box" actions, plug-in actions and abstract actions.

The so called out-of-the-box actions typically include 'send email,' 'call HTTP GET/POST,' 'call a web-service,' and 'start recording session' (as a compressed and encrypted trace file).

The out-of-the-box actions further include 'report to a log server' (with attributes such as log-server address, severity, level and textual message format based on simple XSL). In JAVA, the LOG4J library can be used. This covers also writing to file and other things. In addition, the out-of-the-box actions include report to HSP. This off-the-shelf monitoring tool that can be provided with the Monitor will typically include pre-defined rules for monitoring 3270/5250 sessions. These rules include, for example, a default parameter to report session start and end for all client session, and they include cross data between the user-IP, session type, login user-name and the host.

The action of reporting to a log uses a number of categories (say, DEBUG, INFO, BUSINESS) and levels of severity (INFO, WARNING, ERROR, FATAL), and it determines which messages should go to which category and level. In the default configuration, the report will go to a remote machine or not report at all in order to avoid reduction of disk space over time. Thus, a default configuration, if a local 'syslog' server is installed or the log is written to file, includes a cyclic file with one month history and a download log file (through administration interface). At loading time, the download log file includes information about the number of screens, rules, and conditions, general host information, and startup parameters (rules directory, log configuration, port etc.). At run time, the log file includes, depending on the level, debug information including session start, end, screen detected, rule applied, action, and any admin operation.

Another so called out-of-the-box action is 'write to DB' (write to database the details of the event by mapping fields to columns in a given RDBMS system). In JAVA this is done through JDBC (with attributes that include JDBC driver, database URL, credentials and field mapping).

Further to the above, the Monitor is designed for invoking other action such as 'send NT message' (for NT only). Then, as to plug-in actions, the Monitor is designed to allow for additional action objects to be deployed at run time. Plug-in actions can be added which are written in JAVA. Design time action description might be presented as XML code that indicates to the designer (NMStudio, planner) things like: name of action, description, which input to get from the user, field mapping instructions, etc. This can be implemented using reflection of JAVA classes that answer and comply with a specific interface (e.g., iActionInterface). Preferably, the interface includes the execute methods and is provided with design time and run-time interfaces. These interfaces includes interfaces for setting pre-defined attributes, including: number of re-tries, log object to report failure in execution, etc.; interface for attaching this action at run-time; interface for adding proprietary parameters (maybe by name-value pairs) like email address to use etc.; interface for synchronic invocation (optional); interface for time-out settings; and interface for receiving all the values from the engine (the rule object instance that triggered the action, session stream etc.).

In addition to the foregoing types of actions, this Monitor is designed to support abstract actions. An abstract action is an action which can invoke real actions via links to actions using an XML schema (e.g., they point to a BPEL-WS entity to prompt an action). In other words, abstract actions do nothing except invoke other off-the-shelf and out-of-the-box actions.

We have mentioned before fields subject to operators in the context of WS (see FIG. 5a). Action parameters (much like parameters to a condition) can be of various types, including field, i.e., a reference to the value of a field in the screen. Other types of action parameters include 'string' (string of literals), 'area' (an area from the screen, including column, row, width, height), and 'numeric'. Parameters types can be combined to create values for action (and conditions). Such construction provides also a way to trim leading blanks (left, right, both), trim leading zeros (leading, trailing, all), and convert a string to its numeric representation.

One additional possibility would be, with an action parameter, to allow real-time evaluation of JAVA code. Specifically, it would be possible to add an eclipse plug-in wizard for creating a JAVA actions and conditions. This wizard will also create automatically the XML file code that is installed at design time. This will inform the designer about new conditions and actions it can allow users to incorporate into a rule. The Eclipse plug-in will also auto-generate a JUnit tester for the new condition or action that was created.

Although the present invention advantageously provides real time activity monitoring and reporting, it further provides for session recording, including recording an activity or audit log, and for batch analysis. To this end, the present invention contemplates, in one embodiment, the ability to instruct recording of a session, in part or in its entirety, between a host and a client. For session recording, the Monitor copies to a file the entire stream of data. It saves the data to the file in a compressed form to save space and it encrypts the saved data to preserve privacy and security. In this case, there would be some separation of duties and the ability to run the rules evaluator and action executor in batch over a recorded session. In the design, therefore, the class structure and interface will allow for this functionality, among other things. This design also provides, for rules evaluation, where specified or non-excluded rules are allowed in the command line and checked or non-excluded actions are allowed to execute; and the results written to the log file are the results of allowed rules evaluations and actions. Then, a batch tool is used to run through a session recording, by client IP, date range, and possibly other parameters.

One other possibility is to provide the Monitor with a simple of-the-shelf default tool (e.g., mOnWebToring tool). For this, it is possible to use the PHP portal and mOnWebToring interface by HSP. In Web programming, PHP is a script language and interpreter that is freely available and used primarily on Linux Web servers. PHP, originally derived from Personal Home Page Tools, now stands for PHP: Hypertext Preprocessor. HSP integration is possible, and the Monitor can be designed to allow the same and extended functionality to be achieved without any change to the emulator (e.g., where Rumba™ and OnWeb™ has special code that reports to HSP). This also means that the Monitor can be deployed as an integral part of the Rumba-W2H-HSP package.

As discussed above, a system is configured with an action server in order to allow the action server to hold more concurrent sessions and without any risk achieve separation of duties. This server will be an instance of the Monitor running in mode USE_AS_ACTION_SERVER or USE_REMOTE_ACTION_SERVER. In the first mode, IP, Port, all actions and their inputs will be sent to the action server to be processed; and in the second mode, the port number is provided as well. So, one server is intercepting sessions, parsing and evaluating rules, and the second one runs the actions. It would be possible to cache requests for actions if the action server is not available and commit them later when it becomes available.

Other modes of operation include USE_IN_SILENCE_MODE. In this mode, the Monitor will write to the log that a condition was met and what action should be executed, but it will not execute them.

In connection with separation of duties, as mentioned above in connection with FIG. 3, one of the system configurations uses local proxy (or a local instance of the Monitor in the user PCs). Specifically, the Monitor is instantiated in users' PCs as a client side component (C/C++/C#) that is configured as a local proxy. The communication stream to and from the PCs goes through the local Monitor. This component will hold the logic of parsing and evaluating the rules and will communicate with the action service. The reason for this configuration is to accommodate the preference of some organizations for avoiding overload or addition of resources such as servers and storage.

In terms of deployment, the Monitor can be deployed as a software package or it can be provided as an appliance (a complete functional unit with hardware and software). Preferably, its design features include fully J2EE, scalability to thousand of simultaneous connections, full support for the 3270, 5250 family, design-time tool for complex rule building, full security, administration, logs, encryption of data and control. Additional design features include full support for web-services, both in design and in run-time, application support, separation of duties, per-box responsibility, SSL support, replay support (preconfigured) and batch investigations support. Further implementation details include testing tool for packaged applications, the ability to run conditions on all repository using adaptors, ability to connect to a business process engine or to include a BPM engine.

The platform supported by this design is not limited to but includes support for Linux machines, Windows 2003 server, J2EE application server (e.g., JBOSS 4.x), IBM-WebSphere, etc. For scalability and load-balancing, the Monitor can be implemented in two physical machines that function as one virtual server, where XML rules and configuration files are uploaded to one location and shared by both. In one instance, the system can support at least 400 concurrent users per-server with standard 3270 hit load (think time≈30 second). A machine can be defined as a "rules processor" for other machines. This means that a machine can be configured to accept streams from other appliances (e.g., OnWebIT boxes) and process the rules for them.

Additional design considerations of configuration and management include, a separate servlet to allow viewing as HTML/Web, with a separate user password, the status of the Monitor (e.g., status of OnWebIT box). The status includes: front IP address and DNS (the addresses which the clients connects to), up-time, loaded services (types of decoder/protocols supported and installed on this machine, e.g., 3270 and 5250), list of deployed rules (including, optionally, the ability to see their specific XML definition or as "pseudo—English"), and accumulated statistics for this run.

Design considerations for system administration, include provision for a separate administrator log-in to allow submission of maintenance requests. Such maintenance requests, include 'service re-start' (requires confirmation and re-type of password if there are connected users) and 'reload objects' (Actions, conditions, rules), 'disconnect of all existing sessions' (again, with special confirmation), 'download of rules definitions (XML files) to client', 'upload of rules definition' (replace existing or add), and 'change passwords for users'.

Rules uploading and UI/Web interfaces are designed to be secured by username and password. Thus, there are three types of users: administrator, observer, guest with a default password. If the default password is not changed, it will be reported daily to the Monitor log.

The Monitor will use the NM-Studio (object Builder C#) as the design-time planning tool. And optionally as the deploy interface. The planning tool should allow the user to type in a URL for a live web-service (WSDL over HTTP) or load a WSDL file from the file-system (disk). The planning tool will parse the definition of the web-service and will present it, instead of XML, in a user-friendly GUI that will allow: understanding the separation between a request and the response, identifying parameters and return values and their types, and "clickable" values to attach rules to (the rule type can be automatically determined according to the TAG type).

It should be noted that all screen recognitions, condition evaluation and action executions, will be performed outside the scope of the session between the client and the server. To this end, a separate thread or process is used that will not impact the performance and will not block or break up the connections.

In sum, although the present invention has been described in considerable detail with reference to certain preferred versions thereof, other versions are possible. Therefore, the spirit and scope of the appended claims should not be limited to the description of the preferred versions contained herein.

What is claimed is:

1. A method, comprising:
   in a computerized private network system with a host and one or more clients in communication with the host, instantiating a client session associated with a particular client that interfaces with a server application on the host, the server application having one or more screens associated therewith, each screen containing one or more fields;
   establishing in an application-layer monitor a connection with the server application for the instantiated client session, the application-layer monitor being deployed on the host and logically interposed between the server application on the host and the particular client;
   selecting a field from the one or more fields;
   defining a rule configured to monitor the field for a pre-set condition, the rule initiating an action when the rule is met;
   associating the rule to the field; and
   uploading the rule to the application-layer monitor for subsequent run-time use, the application-layer monitor being configured to substantially in real-time copy all communications between the client and the application on the host and to apply the rule to-field to evaluate activity embodied in client-server communications to determine whether the evaluated activity meets the rule, the action being configured to initiate when the evaluated activity meets the rule.

2. A method as in claim 1, wherein the rule is defined using a wizard at the host.

3. A method as in claim 1, wherein the rule is incorporated in an XML instruction file.

4. A method as in claim 1, further comprising recording the client session, and wherein the action is replaying of the recorded client session.

5. An apparatus comprising:
   means for, in a computerized private network system with a host and one or more clients in communication with the host, instantiating a client session associated with a particular client that interfaces with a server application on the host, the server application having one or more screens associated therewith, each screen containing one or more fields;
   means for establishing in an application-layer monitor a connection with the server application for the instantiated client session, the application-layer monitor being deployed on the host and logically interposed between the server application on the host and the particular client;
   means for selecting a field from the one or more fields;
   means for defining a rule configured to monitor the field for a pre-set condition, the rule initiating an action when the rule is met;

means for associating the rule to the field; and means for uploading the rule to the application-layer monitor for subsequent run-time use, the application-layer monitor being configured to substantially in real-time copy all communications between the client and the application on the host and to apply the rule to the field to evaluate activity embodied in client-server communications to determine whether the evaluated activity meets the rule, the action being configured to initiate when the evaluated activity meets the rule.

6. A program storage device readable by a machine, embodying a program of instructions executable by the machine to perform a method, the method comprising:

in a computerized private network system with a host and one or more clients in communication with the host, instantiating a client session associated with a particular client that interfaces with a server application on the host, the server application having one or more screens associated therewith, each screen containing one or more fields;

establishing in an application-layer monitor a connection with the server application for the instantiated client session, the application-layer monitor being deployed on the host and logically interposed between the server application on the host and the particular client;

selecting a field from the one or more fields;

defining a rule configured to monitor the field for a pre-set condition, the rule initiating an action when the rule is met;

associating the rule to the field; and uploading the rule to the application-layer monitor for subsequent run-time use, the application-layer monitor being configured to substantially in real-time copy all communications between the client and the application on the host and to apply the rule to the field to evaluate activity embodied in client-server communications to determine whether the evaluated activity meets the rule, the action being configured to initiate when the evaluated activity meets the rule.

* * * * *